US008976162B2

(12) United States Patent
Sato

(10) Patent No.: US 8,976,162 B2
(45) Date of Patent: Mar. 10, 2015

(54) ELECTROPHORETIC DISPLAY DEVICE, DRIVING METHOD OF THE SAME, AND ELECTRONIC APPARATUS

(75) Inventor: Takashi Sato, Chino (JP)

(73) Assignee: Seiko Epson Corporation, Tokyo (JP)

( * ) Notice: Subject to any disclaimer, the term of this patent is extended or adjusted under 35 U.S.C. 154(b) by 311 days.

(21) Appl. No.: 13/400,903

(22) Filed: Feb. 21, 2012

(65) Prior Publication Data
US 2012/0223929 A1 Sep. 6, 2012

(30) Foreign Application Priority Data

Mar. 2, 2011 (JP) ................................ 2011-045557

(51) Int. Cl.
*G02F 1/167* (2006.01)
*G09G 3/34* (2006.01)
*G09G 5/00* (2006.01)

(52) U.S. Cl.
CPC ............ *G02F 1/167* (2013.01); *G09G 2310/06* (2013.01); *G02F 2001/1678* (2013.01); *G09G 3/3446* (2013.01); *G09G 2300/0809* (2013.01)
USPC ........... 345/211; 345/107; 359/296; 359/297; 359/295

(58) Field of Classification Search
None
See application file for complete search history.

(56) References Cited

U.S. PATENT DOCUMENTS

| | | | |
|---|---|---|---|
| 7,034,987 B2* | 4/2006 | Schlangen ..................... | 359/296 |
| 7,046,228 B2* | 5/2006 | Liang et al. ................... | 345/107 |
| 7,057,798 B2* | 6/2006 | Ukigaya ....................... | 359/296 |
| 7,283,119 B2* | 10/2007 | Kishi ........................... | 345/107 |
| 7,760,419 B2* | 7/2010 | Lee .............................. | 359/296 |
| 7,876,305 B2* | 1/2011 | Zhou et al. ................... | 345/107 |
| 7,933,062 B2 | 4/2011 | Masuzawa et al. | |
| 2005/0104843 A1 | 5/2005 | Schlangen | |
| 2005/0213014 A1 | 9/2005 | Feenstra et al. | |

(Continued)

FOREIGN PATENT DOCUMENTS

| | | |
|---|---|---|
| JP | 2005-517995 A | 6/2005 |
| JP | 2005-283789 A | 10/2005 |

(Continued)

OTHER PUBLICATIONS

IEEE, Standards Definitions for Selected Quantities, Units and Related Terms, Sep. 26, 2006, IEEE, IEEE Std 270-2006, p. 30.*

(Continued)

*Primary Examiner* — Sumati Lefkowitz
*Assistant Examiner* — Douglas M Wilson
(74) *Attorney, Agent, or Firm* — ALG Intellectual Property, LLC

(57) ABSTRACT

The electrophoretic display device includes: an electrophoretic layer which is disposed between first and second substrates disposed to face each other and has a plurality of first electrically-charged particles colored into a first color, a plurality of second electrically-charged particles colored into a second color, and a dispersion medium which retains the first and second electrically-charged particles; first and second pixel electrodes provided on the first substrate; an opposite electrode provided on the second substrate; and a reflective electrode provided at a position on the first substrate side rather than on the electrophoretic layer, wherein the first electrically-charged particle has permeability in a first wavelength region and absorbability in the other wavelength regions, and the second electrically-charged particle has reflectivity in a second wavelength region and absorbability in the other wavelength regions.

15 Claims, 24 Drawing Sheets

(56) References Cited

U.S. PATENT DOCUMENTS

| | | | |
|---|---|---|---|
| 2007/0222745 A1* | 9/2007 | Kawai | 345/107 |
| 2007/0268245 A1 | 11/2007 | Sugita et al. | |
| 2008/0231592 A1 | 9/2008 | Johnson et al. | |
| 2011/0134508 A1 | 6/2011 | Kawashima et al. | |
| 2012/0001842 A1* | 1/2012 | Stellbrink | 345/107 |

FOREIGN PATENT DOCUMENTS

| | | |
|---|---|---|
| JP | 2007-519046 A | 7/2007 |
| JP | 2007-310182 A | 11/2007 |
| JP | 2009-9092 A | 1/2009 |
| JP | 2009-192637 A | 8/2009 |
| JP | 2010-67767 A | 3/2010 |
| JP | 2010-72617 A | 4/2010 |

OTHER PUBLICATIONS

Sheffield Hallam University, Beer's Law, Dec. 5, 2010, http://teaching.shu.ac.uk/hwb/chemistry/tutorials/molspec/beers1.htm, pp. 1-3.*

* cited by examiner

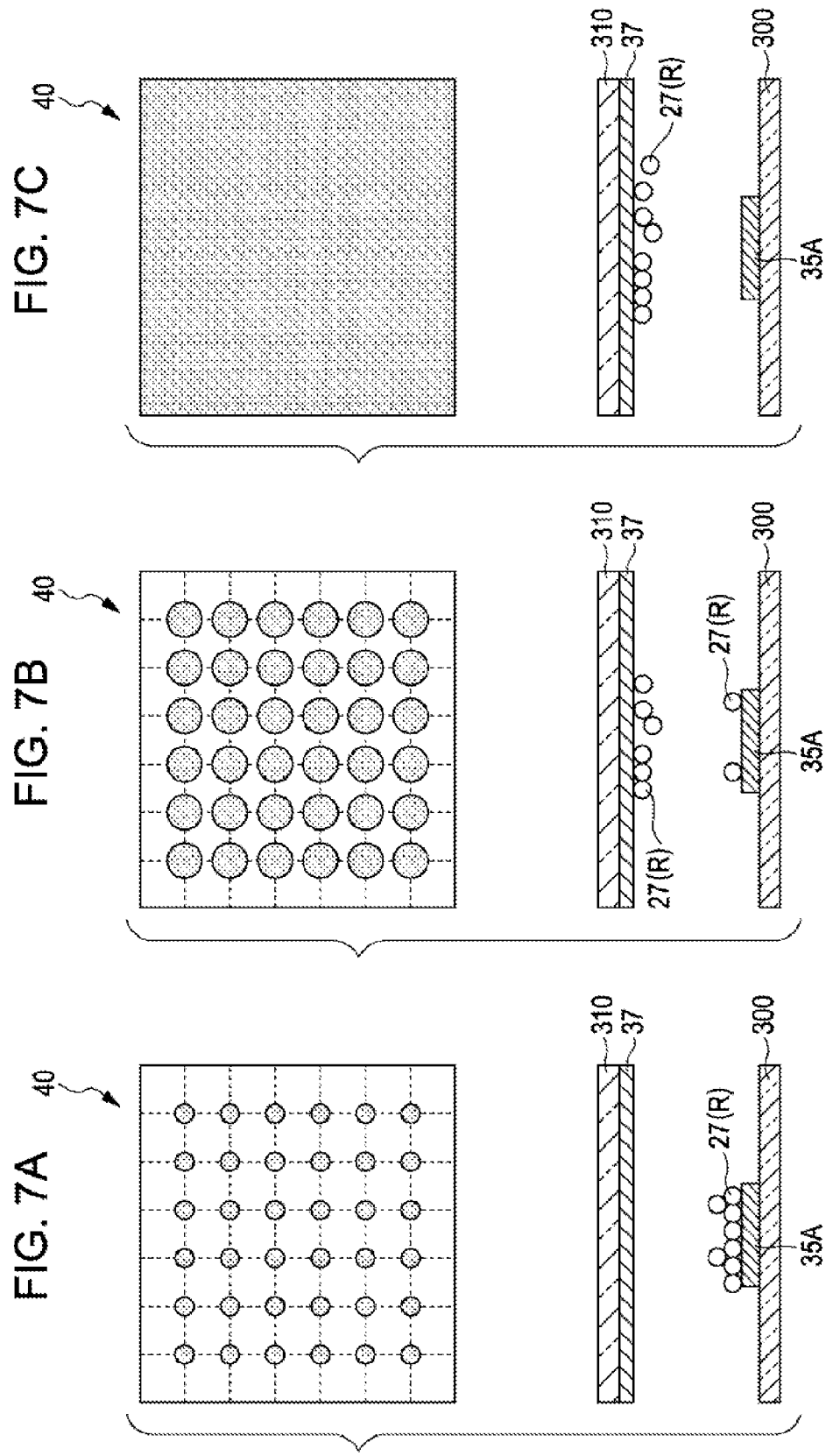

WHITE DISPLAY

RED DISPLAY

BLUE DISPLAY

BLACK DISPLAY

DARK RED DISPLAY   BLACK DISPLAY AREA

DARK BLUE DISPLAY

MAGENTA DISPLAY

PALE RED DISPLAY

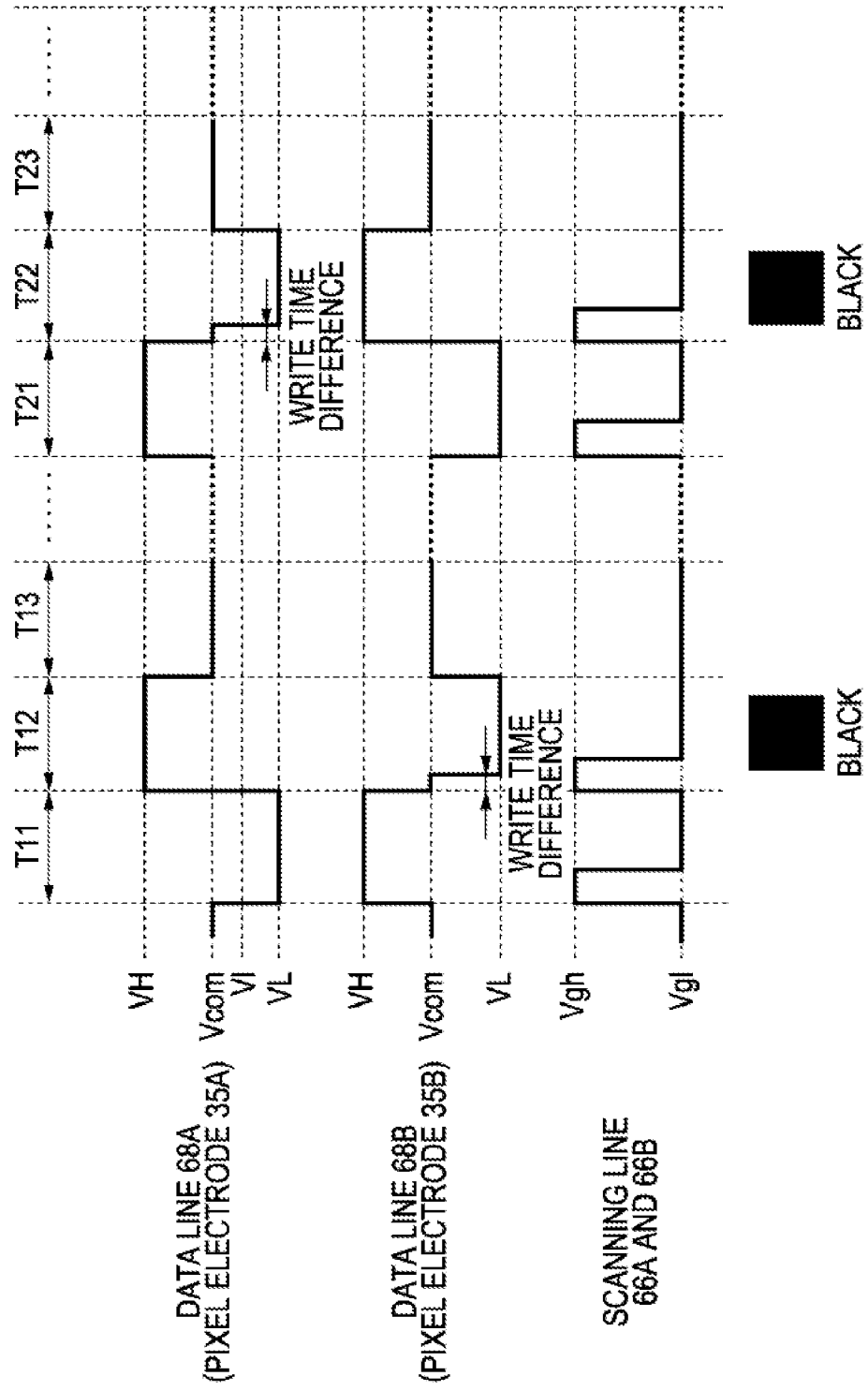

BLACK DISPLAY

BLACK DISPLAY

BLACK DISPLAY

RED DISPLAY

BLACK DISPLAY

DARK RED DISPLAY

MAGENTA DISPLAY

ELECTROPHORETIC DISPLAY DEVICE, DRIVING METHOD OF THE SAME, AND ELECTRONIC APPARATUS

BACKGROUND

1. Technical Field

The present invention relates to an electrophoretic display device, a method of driving the electrophoretic display device, and an electronic apparatus.

2. Related Art

As disclosed in JP-A-2007-310182 and JPA-2010-72617, electrophoretic display devices capable of performing color display using colored particles have been proposed. However, a problem of low contrast is present, and an electrophoretic display device having sufficient display performance has not been proposed.

In JP-A-2007-310182, a device which performs display by separating one pixel into two sub-pixels and making colored particles of two colors be retained in the respective sub-pixels is described. Specifically, a method of performing display by using particles of two colors, red and blue, for each sub-pixel is described. However, only displays of four colors, that is, white display, black display, red display, and blue display are possible. Further, in black display, since red particles and blue particles are distributed in a random manner in a dispersion medium, external light incident from the opposite substrate side is not absorbed by each particle and blue light and red light leak to the outside, so that there is concern that a clear black display may not be performed.

Further, in JP-A-2010-72617, a method is described in which one pixel is separated into a plurality of sub-pixels by partition walls or the like and the respective sub-pixels are respectively driven. Here, the relationship between colors in a colored particle and the dispersion medium retained in each sub-pixel is a complementary color relationship and, for example, yellow particles and a blue dispersion medium are used. In order to perform full-color display, it is necessary to perform arbitrary control of two colors. However, in JP-A-2010-72617, control of gradation or the like by the positions of the particles is possible. However, since the color of the dispersion medium cannot be controlled, only four-color display is possible.

In this manner, in the existing configurations, there are problems in which display close to a full color is not possible and furthermore, black display floats.

SUMMARY

An advantage of some aspects of the invention is that it provides an electrophoretic display device in which full-color display or display equivalent thereto is possible and high-contrast image display is possible, a method of driving the electrophoretic display device, and an electronic apparatus.

According to a first aspect of the invention, there is provided an electrophoretic display device including: first and second substrates disposed to face each other; an electrophoretic layer which is disposed between the first substrate and the second substrate and has a plurality of first electrically-charged particles colored into a first color, a plurality of second electrically-charged particles colored into a second color, and a dispersion medium which retains the first and second electrically-charged particles; first and second pixel electrodes which are disposed on the electrophoretic layer side of the first substrate and driven independently of each other; an opposite electrode which is disposed on the electrophoretic layer side of the second substrate; and a reflective electrode which is provided on the first substrate, wherein the first electrically-charged particle has permeability in a first wavelength region and absorbability in other wavelength regions, and the second electrically-charged particle has reflectivity in a second wavelength region and absorbability in other wavelength regions.

According to this configuration, basically, five-color display, that is, the first color of the first electrically-charged particles, the second color of the second electrically-charged particles, a mixed color of the first color and the second color, white, and black can be performed, so that a variety of expressions can be realized. Further, some of the light incident from the second substrate side is reflected by the reflective electrode, so that a brighter display, particularly, white display closer to that of the paper can be realized.

Further, a configuration may also be made in which the difference between the first wavelength region and the second wavelength region is equal to or less than 10% of a peak wavelength of a light intensity.

According to this configuration, it is possible to reduce light which is leaked to the outside without being absorbed in any of the first and second electrically-charged particles. For this reason, clear and excellent black display can be realized.

Further, a configuration may also be made in which a first transistor which is connected to the first pixel electrode and a second transistor which is connected to the second pixel electrode are provided for each pixel and the first electrically-charged particles and the second electrically-charged particles are electrically charged to have any one of a positive polarity and a negative polarity.

According to this configuration, since the distribution states of the first and second electrically-charged particles in the pixel can be controlled by the application conditions of voltages which are respectively input to the respective pixel electrodes through the respective transistors, in addition to the expressions of the five colors, gradation expressions thereof also become possible.

Further, a configuration may also be made in which the electrophoretic display device further includes a first connection electrode connected to a drain electrode of the first transistor, and a second connection electrode connected to a drain electrode of the second transistor, wherein a plurality of the first pixel electrodes are connected to each other by the first connection electrode formed in a layer on the first substrate side rather than on the first pixel electrode, and a plurality of the second pixel electrodes are connected to each other by the second connection electrode formed in a layer on the first substrate side rather than on the second pixel electrode.

According to this configuration, driving of the plurality of first pixel electrodes and driving of the plurality of second pixel electrodes can be performed at the same time.

Further, a configuration may also be made in which a covering layer is provided on the first substrate so as to cover the first connection electrode and the second connection electrode, a plurality of through-holes which partially expose the first and second connection electrodes are formed in the covering layer, a portion of the first connection electrode which is exposed through the through-hole is configured to function as the first pixel electrode, and a portion of the second connection electrode which is exposed through the through-hole is configured to function as the second pixel electrode.

According to this configuration, since there is no need to separately form pixel electrodes, the configuration is simplified, so that manufacturing is facilitated.

Further, a configuration may also be made in which a scattering property is imparted to the surface of the reflective electrode.

According to this configuration, by scattering reflected light which is reflected by the reflective electrode, a color-developing property of a display color is further improved and it is also possible to reduce regular reflection of external light in white display.

Further, a configuration may also be made in which an electric potential can be input to the reflective electrode.

According to this configuration, by inputting an electric potential which repels the electrically-charged particles to the reflective electrode, movement of the electrically-charged particles onto the reflective electrode is prevented, so that the electrically-charged particles can be smoothly moved to the opposite electrode side. As a result, switching displays can be stably carried out in a short time.

Further, a configuration may also be made in which the distance between the reflective electrode and each of the pixel electrodes in a plane direction is longer than the distance between each of the pixel electrodes and the opposite electrode.

According to this configuration, during an operation of moving the electrically-charged particles from the pixel electrodes to the opposite electrode, it is possible to prevent movement of the electrically-charged particles onto the reflective electrode.

Further, a configuration may also be made in which during black display, the first electrically-charged particles having permeability are disposed on the opposite electrode side rather than on the second electrically-charged particles having reflectivity.

According to this configuration, some of the lights other than light of a first color of external light incident from the opposite substrate side are absorbed in the first electrically-charged particles, and light of a second color among lights which have penetrated the first electrically-charged particles is reflected by the second electrically-charged particles and the other lights are absorbed. Then, the light of the second color reflected by the second electrically-charged particles is absorbed in the first electrically-charged particles. As a result, clear black display can be obtained.

According to a second aspect of the invention, there is provided a method of driving an electrophoretic display device which includes: first and second substrates disposed to face each other, an electrophoretic layer which is disposed between the first substrate and the second substrate and has a plurality of first electrically-charged particles colored into a first color, a plurality of second electrically-charged particles colored into a second color, and a dispersion medium which retains the first and second electrically-charged particles, a plurality of first pixel electrodes and a plurality of second pixel electrodes which are disposed on a surface on the electrophoretic layer side of the first substrate and driven independently of each other, an opposite electrode which is disposed on the electrophoretic layer side of the second substrate, and a reflective electrode which is provided on the first substrate, wherein the first electrically-charged particle has permeability in a first wavelength region and absorbability in the other wavelength regions, and the second electrically-charged particle has reflectivity in a second wavelength region and absorbability in the other wavelength regions, the method including: performing a first operation of moving the first electrically-charged particles to the opposite electrode side by applying voltages to the first pixel electrode and the opposite electrode; and performing a second operation of moving the second electrically-charged particles to the opposite electrode side by applying voltages to the second pixel electrode and the opposite electrode, wherein the first electrically-charged particles having permeability are disposed on the opposite electrode side rather than on the second electrically-charged particles having reflectivity.

According to this configuration, basically, five-color display, that is, the first color of the first electrically-charged particles, the second color of the second electrically-charged particles, a mixed color of the first color and the second color, a white, and a black become possible, so that a variety of expressions can be realized. Further, some of the light incident from the second substrate side is reflected by the reflective electrode, so that brighter display can be obtained and particularly, white display closer to that of the paper can be realized.

Further, a driving method may also be made in which between the first operation and the second operation, a difference is provided at application timings of the voltages or the magnitudes of the applied voltages.

According to this configuration, since it is possible to control the distribution ranges, the distribution state, or the like of the first and second electrically-charged particles in a pixel, in addition to the expressions of the five colors described above, gradation expressions of the five colors can be realized, and since adjustment of brightness or saturation can also be performed, an expression close to approximate full-color becomes possible.

Further, a driving method may also be made in which in the first operation, an electric potential which repels the first electrically-charged particles is applied to the reflective electrode and in the second operation, an electric potential which repels the second electrically-charged particles is applied to the reflective electrode.

According to this configuration, an electric potential which repels the electrically-charged particles that are moved to the opposite electrode side is input to the reflective electrode, whereby movement of the electrically-charged particles becomes smooth, so that switching displays can be stably carried out in a short time.

Further, a driving method may also be made in which the driving method further includes: a first preset operation of applying different voltages to the first pixel electrode and the second pixel electrode; and a second preset operation of applying voltages having the opposite polarities to those of the voltages in the first preset operation to the first pixel electrode and the second pixel electrode, wherein the first preset operation and the second preset operation are alternately carried out for every rewriting of a single screen or plural screens.

According to this configuration, application of direct-current voltage between each pixel electrode and the opposite electrode is prevented, so that it is possible to suppress corrosion of the electrodes or deterioration of the electrophoretic material.

Further, a driving method may also be made in which the first electrically-charged particles having permeability are disposed on the opposite electrode side rather than on the second electrically-charged particles having reflectivity.

According to this configuration, some of the lights other than light of a first color of external light incident from the opposite substrate side are absorbed in the first electrically-charged particles, and light of a second color among lights which have penetrated the first electrically-charged particles is reflected by the second electrically-charged particles and the other lights are absorbed. Then, the light of the second color reflected by the second electrically-charged particles is absorbed in the first electrically-charged particles. As a result, clear black display can be realized.

Further, a driving method may also be made in which a large number of the first electrically-charged particles are stacked on the opposite electrode in a multilayer state so as to overlap each other.

According to this configuration, when light incident from the second substrate side penetrates the multilayered first electrically-charged particles, since the light is reflected and made to have a different direction as needed, an action similar to scattered reflection is obtained, so that bright display can be obtained. That is, since light penetrates a plurality of first electrically-charged particles, thereby causing scattered reflection without directivity, and this phenomenon occurs in the vicinity of the opposite electrode, display having a wide viewing angle can be obtained.

According to a third aspect of the invention, there is provided an electronic apparatus provided with the electrophoretic display device described above.

According to this configuration, since the electronic apparatus is configured to be provided with the electrophoretic display device described previously, a high-grade electronic apparatus having excellent reliability, which can perform display close to a full color being bright and having excellent visibility, can be obtained.

BRIEF DESCRIPTION OF THE DRAWINGS

The invention will be described with reference to the accompanying drawings, wherein like numbers reference like elements.

FIGS. 7A to 7C are conceptual diagrams of the pixel illustrating a difference in gradation by the areas of colored particles which are visible when viewed from the observation side.

FIG. 15 is a timing chart illustrating a driving method when black display is continuously performed.

DESCRIPTION OF EXEMPLARY EMBODIMENTS

Hereinafter, embodiment of the invention will be described with reference to the drawings. In addition, in each drawing which is used in the following explanation, in order to show each member at a recognizable size, the scale of each member is appropriately changed.

Electrophoretic Display Device of First Embodiment

Figure 1A:
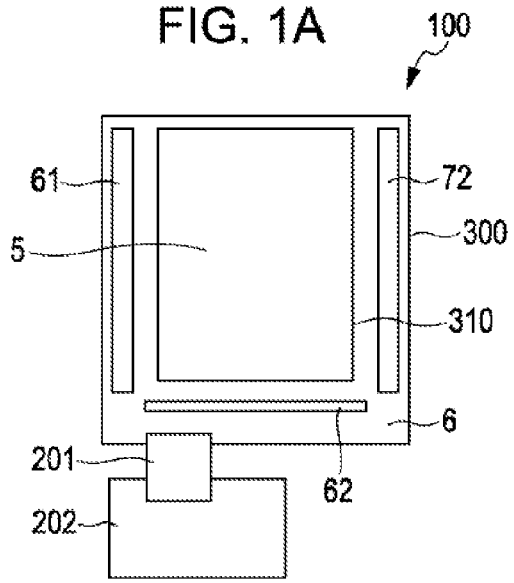
FIGS. 1A and 1B are diagrams illustrating the schematic configuration of an electrophoretic display device related to an embodiment of the invention.
Figure 1B:
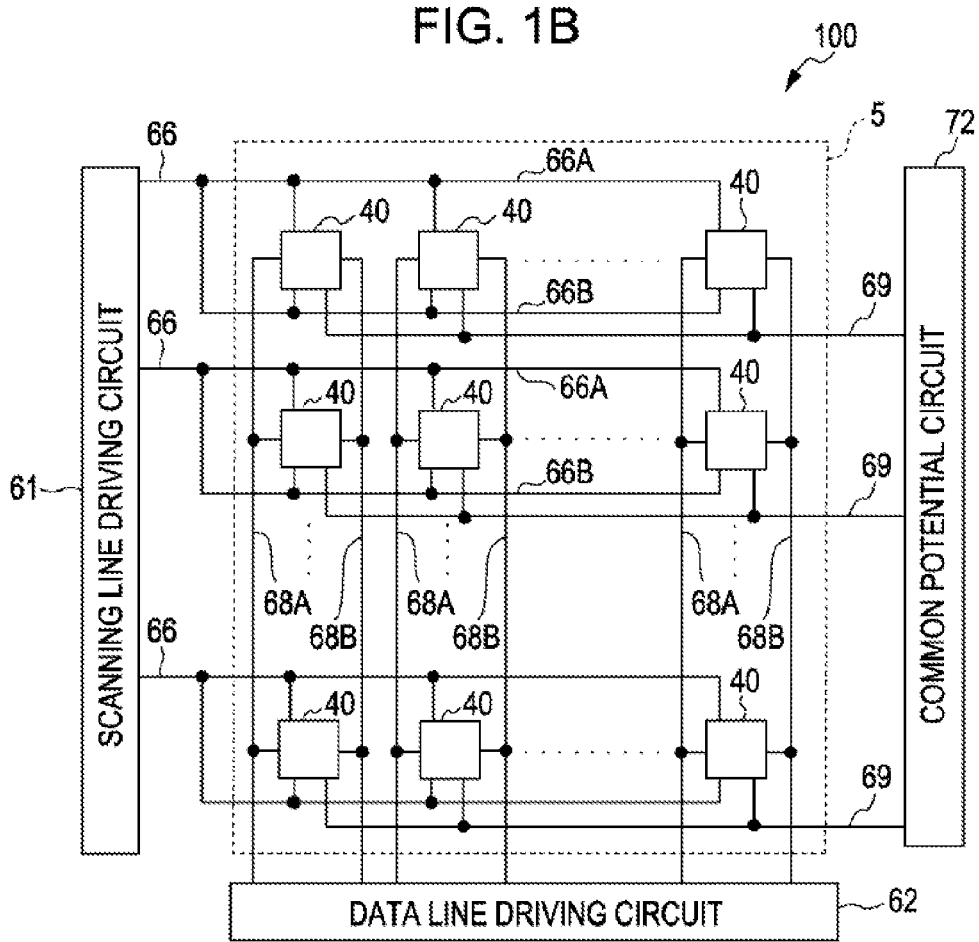

FIGS. 1A and 1B are diagrams illustrating the schematic configuration of an electrophoretic display device related to an embodiment of the invention, wherein FIG. 1A is an external view and FIG. 1B is an equivalent circuit.

As shown in FIGS. 1A and 1B, an electrophoretic display device 100 related to this embodiment includes an element substrate 300 which is made of a semiconductor device, an opposite substrate 310 disposed to face the element substrate 300, and an electrophoretic layer 32 which is sandwiched between these substrates. An image display section 5 in which a plurality of pixels 40 are disposed in a matrix form is formed at an area where the element substrate 300 and the opposite substrate 310 overlap each other. Further, a scanning line driving circuit 61, a data line driving circuit 62, and a common potential circuit 72 are mounted on an area outside the image display section 5, that is, a non-display section 6 protruding further outward than the opposite substrate 310, and respectively connected to wirings (scanning lines 66 (66A and 66B), data lines 68A and 68B, and common potential lines 69) extending from the inside of the image display section 5, through connection terminals formed at relevant areas. Further, an external circuit substrate 202 for driving each of the driving circuits described above is connected onto the element substrate 300 protruding further outward than the opposite substrate 310, through a connection substrate 201.

Figure 2:
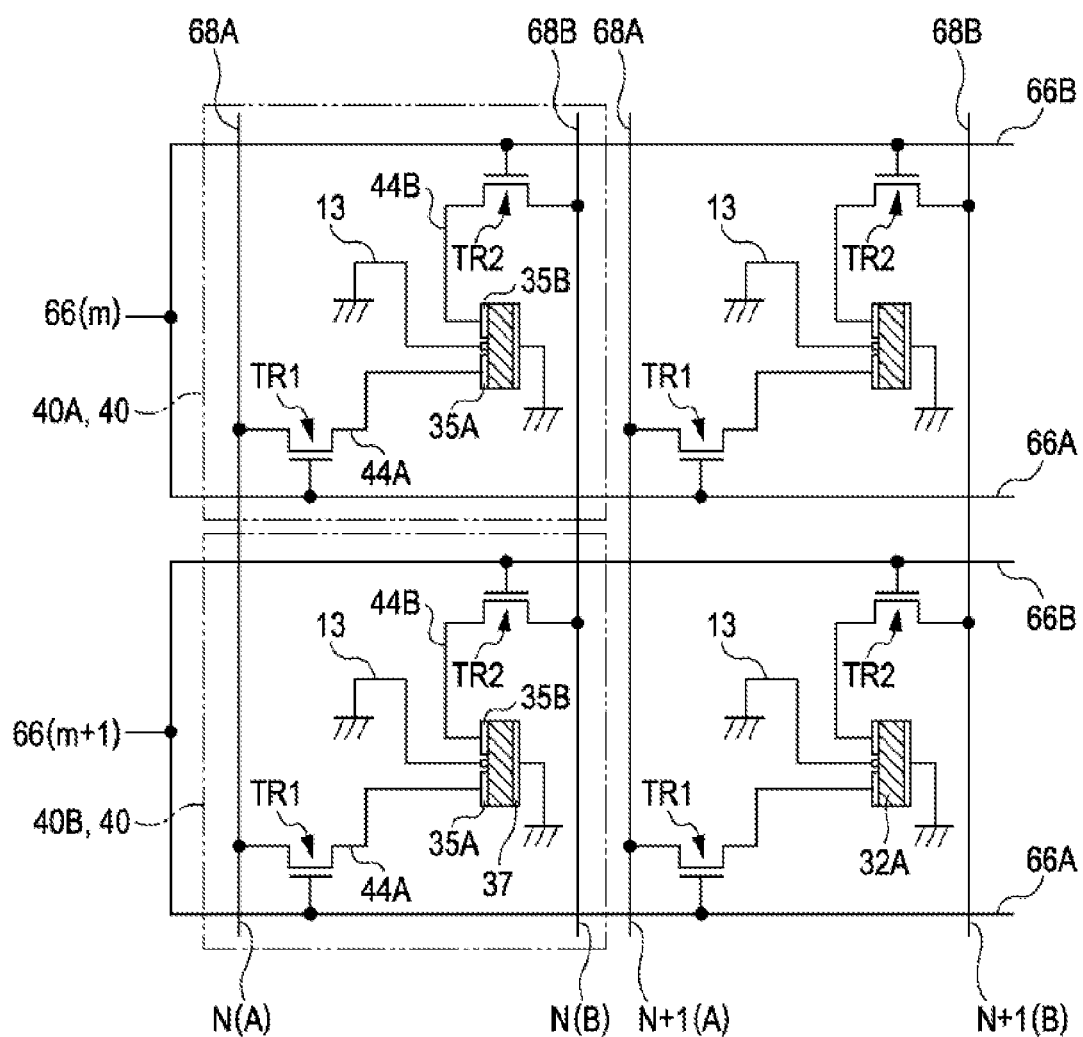
FIG. 2 is an equivalent circuit diagram illustrating a specific configuration example of the electrophoretic display device.

FIG. 2 is an equivalent circuit diagram illustrating a specific configuration example of the electrophoretic display device.

Figure 4:
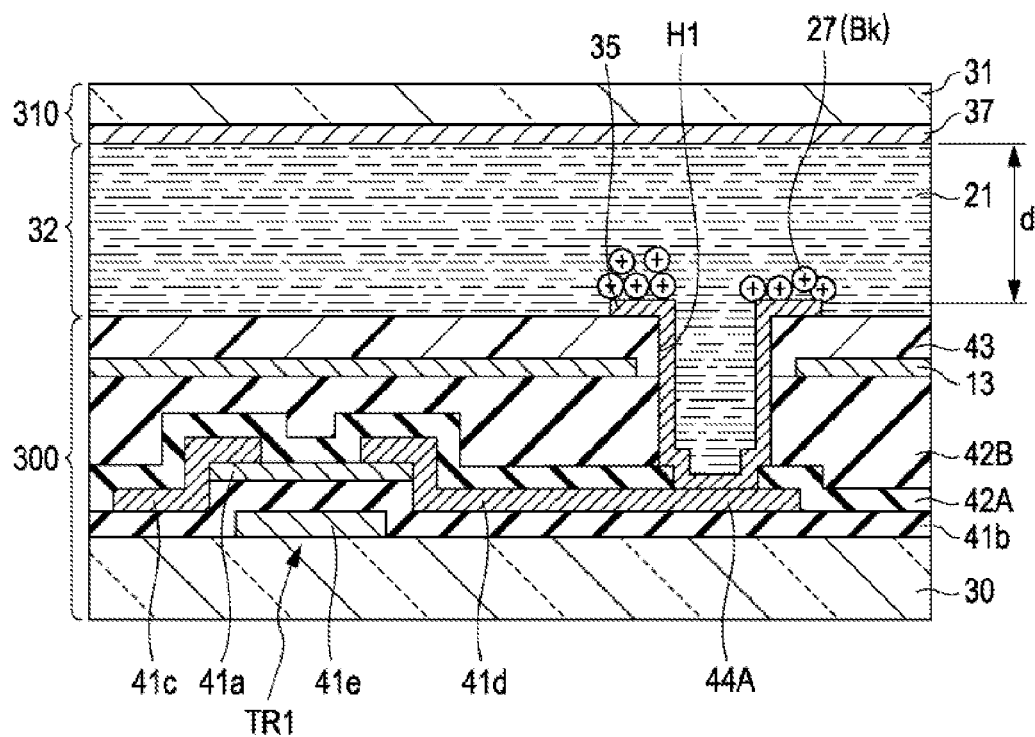
FIG. 4 is a cross-sectional view taken along line IV-IV of FIG. 3.

As shown in FIG. 2, in the electrophoretic display device 100 related to this embodiment, a plurality of scanning lines 66 and a plurality of data lines 68A and 68B which extend in directions intersecting one another are provided on one face side (on a first substrate 30; FIG. 4) of the element substrate 300. Here, each scanning line 66 related to this embodiment has a first scanning line 66A and a second scanning line 66B bifurcated inside the image display section 5.

In one pixel 40, the electrophoretic layer 32 made of an electrophoretic material, two selection transistors TR1 (a first transistor) and TR2 (a second transistor), two pixel electrodes 35A (a first pixel electrode) and 35B (a second pixel electrode), an opposite electrode 37, a connection electrode (a first connection electrode) 44A, a connection electrode (a second connection electrode) 44B, and a reflective electrode 13 are provided.

In the selection transistor TR1, the gate thereof is connected to the first scanning line 66A, the source is connected to the data line 68A, and the drain is connected to the pixel electrode 35A (the electrophoretic layer 32). In the selection transistor TR2, the gate thereof is connected to the second scanning line 66B, the source is connected to the data line 68B, and the drain is connected to the pixel electrode 35B (the electrophoretic layer 32).

In the pixel 40A among the pixels 40A and 40B adjacent to each other in the extending direction of each of the data lines 68A and 68B, the scanning line 66 of an m-row is connected to the gate of each of the selection transistors TR1 and TR2. Then, the data line 68A of an N(A)-column is connected to the source of the selection transistor TR1, and the data line 68B of an N(B)-column is connected to the source of the selection transistor TR2.

Here, it is also possible to take a configuration in which a storage capacitor is disposed between the drain of each of the selection transistors TR1 and TR2 and a storage capacitor line (not shown). The storage capacitor line is formed in a direction parallel to the scanning line 66 simultaneously with the scanning line 66, for example. Further, a section other than the storage capacitor, for applying voltage to the electrophoretic layer 32, may also be provided.

The connection electrode 44A is connected to the drain of the selection transistor TR1 and also to the pixel electrode 35A, and the connection electrode 44B is connected to the drain of the selection transistor TR2 and also to the pixel electrode 35B.

The reflective electrode 13 is present between the respective pixel electrodes 35A and 35B and voltage having approximately the same potential as the potential of the opposite electrode 37 is applied to the reflective electrode 13. The reflective electrode 13 has reflectivity at least at the surface (the surface on the electrophoretic layer 32 side) thereof.

Figure 3:
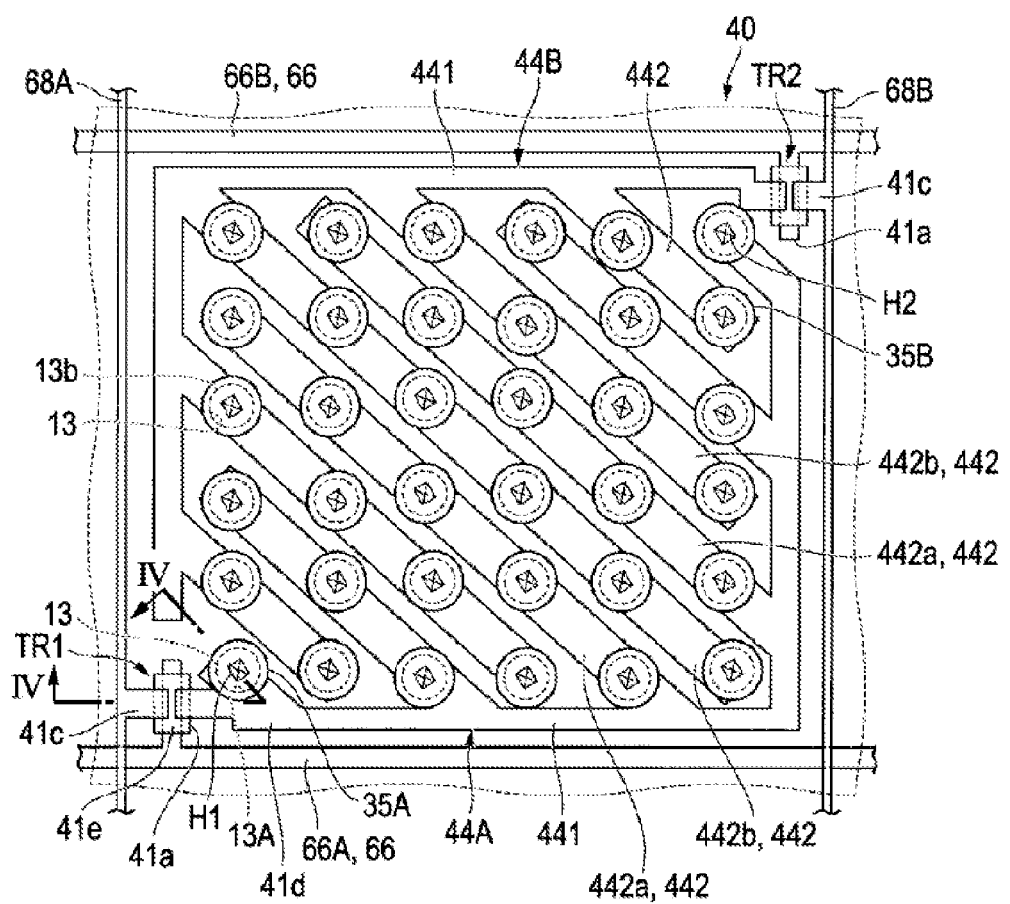
FIG. 3 is a plan view showing a specific configuration example of one pixel on the element substrate side related to a first embodiment.

FIG. 3 is a plan view showing a specific configuration example of one pixel on the element substrate side related to the first embodiment, and FIG. 4 is a cross-sectional view taken along line IV-IV of FIG. 3.

First, the configuration of the element substrate 300 will be described in detail.

As shown in FIG. 3, the electrophoretic display device 100 has a configuration of a 1-pixel and 2-TFT type and is provided with the element substrate 300 which is configured to include the selection transistors TR1 and TR2, the connection electrodes 44A and 44B, the plurality of pixel electrodes 35A and 35B, and the reflective electrode 13 that are provided on the first substrate 30 for each pixel 40.

The pixel electrode 35A and the pixel electrode 35B are respectively provided in a plurality in one pixel, and in this embodiment, both the pixel electrodes exhibit a circular shape in a plan view. The plurality of pixel electrodes 35A are connected to each other by the connection electrode 44A to which the respective pixel electrodes 35A are connected through contact holes H1, and the plurality of pixel electrodes 35B are connected to each other by the connection electrode 44B to which the respective pixel electrodes 35B are connected through contact holes H2.

A drain electrode 41$d$ of the selection transistor TR1 is connected to the plurality of pixel electrodes 35A through the connection electrode 44A, and a drain electrode 41$d$ of the selection transistor TR2 is connected to the plurality of pixel electrodes 35B through the connection electrode 44B. Then, a data potential from the data line 68A is applied to the plurality of pixel electrodes 35A through the selection transistor TR1, and a data potential from the data line 68B is applied to the plurality of pixel electrodes 35B through the selection transistor TR2. In this way, a configuration is made in which the plurality of pixel electrodes 35A and the plurality of pixel electrodes 35B can be driven independently of each other.

Each of the connection electrodes 44A and 44B exhibits a toothcomb shape in a plan view and is configured to have a stem portion 441 formed by two sides extending along two directions (for example, the extending directions of the scanning lines 66A and 66B or the data lines 68A and 68B), thereby exhibiting an L-shape on the whole, and a plurality of branch portions 442 connected to the stem portion 441. The plurality of branch portions 442 extends parallel to each other in a direction (here, a direction of about 60° with respect to each side of the stem portion 441. However, it is not limited thereto and a direction of, for example, 45° is also acceptable) different from the extending directions of the stem portion 441, and the extending lengths of all the branch portions 442 are made different from each other. The branch portion 442 extending from the vicinity of a corner portion (a bend portion) of the stem portion 441 is the longest, and the more distant the branch portion 442 becomes from the central branch portion 442, the shorter the length becomes.

The connection electrodes 44A and 44B each exhibiting a toothcomb shape in a plan view are disposed in the pixel 40 so as to be engaged with each other. That is, a state is created where branch portions 442$b$ and 442$b$ of the connection electrode 44B on the other side are present on both sides of a branch portion 442$a$ of the connection electrode 44A on one side.

Each branch portion 442$a$ of the connection electrode 44A corresponds to the plurality of pixel electrodes 35A and each branch portion 442$b$ of the connection electrode 44B corresponds to the plurality of pixel electrodes 35B.

The reflective electrode 13 has the configuration of allowing an electric potential to be input thereto, is formed in a solid state on almost the entirety of the pixel area so as to cover the selection transistors TR1 and TR2, and has a plurality of openings 13A and 13B each having a circular shape in a plan view, at positions corresponding to the pixel electrodes 35A and 35B. The diameter of each of the openings 13A and 13B is a smaller diameter than the diameter of each of the pixel electrodes 35A and 35B and is set to have a dimension in which a clearance is not formed between each of the pixel electrodes 35A and 35B and the reflective electrode 13 in a plane direction. For this reason, there is no dead area as the reflective electrode 13, so that bright image display can be obtained.

In addition, the reflective electrode 13 is made to be common in all the pixels 40. However, the reflective electrode 13 is not limited to such a configuration and may also be provided independently for each pixel 40. In this case, a configuration is made in which among the pixel electrodes 35A and the pixel electrodes 35B, for example, a plurality of the pixel electrodes 35A is electrically connected to the reflective electrode 13. When drawing particles distributed on the opposite electrode 37 to the pixel electrode 35A side, the same voltage is applied to the reflective electrode 13 and the pixel electrode 35A. Since a protective film 43 is present between the electrophoretic layer 32 and the reflective electrode 13 and voltage that is low by voltage which is applied to the protective film 43 is applied from the reflective electrode 13 to the particles, it is possible to prevent the particles from being drawn and stuck onto the surface of the protective film 43 on the reflective electrode 13.

For this reason, it is preferable that the film thickness of the protective film 43 be thick and as the film thickness, 2 μm or greater, more preferably, 10 μm or greater is suitable. Alternately, 5% or greater, more preferably, 50% or greater of a cell gap d is suitable. In such a condition, a voltage that is applied from the reflective electrode 13 to the particles is always smaller than voltage that is applied to the pixel electrode and has the same polarity. For this reason, the electric potential of the reflective electrode 13 does not block movement of the particles.

Here, the cell gap d is the distance between each of the pixel electrodes 35A and 35B and the opposite electrode 37 (approximately, the distance between the element substrate 300 and the opposite substrate 310) in the electrophoretic display device 100. In FIG. 4, the cell gap is 20 μm. However, it is not limited to 20 μm.

As shown in FIGS. 3 and 4, the first substrate 30 is made of a glass substrate having a thickness of 0.5 mm, and a gate electrode 41e (the scanning line 66) made of aluminum (Al) and having a thickness of 300 nm is formed on the surface thereof. Then, a gate insulating film 41b made of a silicon oxide film and having a thickness of 300 nm is formed on the entire surface of the first substrate 30 so as to cover the gate electrode 41e, and a semiconductor layer 41a made of a-IGZO (oxides of In, Ga, and Zn) and having a thickness of 50 nm is formed just above the gate electrode 41e.

On the gate insulating film 41b, a source electrode 41c (the data lines 68A and 68B) and a drain electrode 41d, each of which is made of Al and has a thickness of 200 nm, are provided so as to partially overlap with the gate electrode 41e and the semiconductor layer 41a. The source electrode 41c and the drain electrode 41d are formed so as to be partially laid on the semiconductor layer 41a. Further, the connection electrodes 44A and 44B likewise made of aluminum (Al) and having a thickness of 200 nm are formed on the gate insulating film 41b. These connection electrodes 44A and 44B are patterned and formed simultaneously with the source electrode 41c and the drain electrode 41d and the connection electrode 44A (the connection electrode 44B) is connected to the drain electrode 41d of the selection transistor TR1 (the selection transistor TR2).

Here, as the selection transistor TR1 (the selection transistor TR2), a general a-Si TFT, a poly-Si TFT, an organic TFT, an oxide TFT, or the like can be used. Further, also regarding the structure thereof, both a top-gate structure and a bottom-gate structure are possible.

An interlayer insulating film (a covering layer) 42A made of hydrogenated silicon nitride and having a thickness of 300 nm and an interlayer insulating film (a covering layer) 42B made of photosensitive acrylic and having a thickness of 1 μm are laminated in this order on the selection transistor TR1 (the selection transistor TR2) and the connection electrodes 44A and 44B so as to cover the selection transistor and the connection electrodes. The reflective electrode 13 made of Al and having a thickness of 200 nm is formed on the interlayer insulating film 42B and the protective film (a covering layer) 43 made of photosensitive acrylic and having a thickness of 10 μm is formed so as to cover the reflective electrode 13. The plurality of pixel electrodes 35A and 35B are disposed on the surface of the protective film 43.

The reflective electrode 13 is provided to be common to all the pixels 40 in the image display section 5 and is connected to an electric power supply at the outer side of the image display section 5. Here, a scattering property may also be imparted to the reflective electrode 13. In this case, a metal oxide film may also be separately formed on the surface of the reflective electrode 13 and may also be constituted by oxidizing the surface of a metal pattern constituting the reflective electrode 13. As the oxide, for example, alumina, titania, or the like can be given. By scattering reflected light, the color-developing property of a display color is improved and regular reflection of external light in white display can also be reduced.

In addition, as materials of the interlayer insulating films 42A and 42B and the protective film 43, here, acrylic is used. However, it is also possible to use materials other than it and an inorganic insulating film such as a silicon oxide and an organic insulating film are also acceptable.

On the protective film 43, the plurality of pixel electrodes 35A and the plurality of pixel electrodes 35B each of which is made of Al and has a thickness of 50 nm are provided for each pixel. Among the plurality of pixel electrodes 35A and 35B, the pixel electrodes 35A are electrically connected to each other by the connection electrode 44A to which the pixel electrodes 35A are individually connected through the contact holes H1 that penetrate the protective film 43, the interlayer insulating films 42A and 42B, and the gate insulating film 41b in the thickness direction, and the pixel electrodes 35B are electrically connected to each other by the connection electrode 44B to which the pixel electrodes 35B are individually connected through the contact holes H2. Since these connection electrodes 44A and 44B are respectively formed by extending the drain electrodes 41d of the selection transistors TR1 and TR2, when the switches of the selection transistors TR1 and TR2 are closed, image signals from the data lines 68A and 68B are respectively supplied to the pixel electrodes 35A and 35B through the respective connection electrodes 44A and 44B. Accordingly, the pixel electrodes 35A and 35B disposed in one pixel are driven independently of each other. In this manner, the element substrate 300 is constituted by the elements from the first substrate 30 to the pixel electrodes 35A and 35B.

On the element substrate 300, the opposite substrate 310 is disposed to face the element substrate 300 with the electrophoretic layer 32 interposed therebetween.

The opposite substrate 310 is constituted by a second substrate 31 made of a glass substrate having a thickness of 0.5 nm and the opposite electrode 37 made of an ITO having a thickness of 100 nm and formed on the surface thereof on the electrophoretic layer 32 side. Since the opposite electrode 37 is on the visible side, as the opposite electrode 37, a transparent electrode is used.

The opposite electrode 37 has an area wider than the sum of the areas of the plurality of island-shaped pixel electrodes 35A and the plurality of island-shaped pixel electrodes 35B provided on the element substrate 300 side and becomes a continuous electrode (a solid electrode) in an area contributing to display at least in the pixel 40. In the opposite electrode 37, a cutout portion without an electrode may also be provided as necessary.

Here, as constituent materials of electrodes which are used for the opposite electrode 37, the pixel electrode 35A, and the pixel electrode 35B, provided that materials are those substantially having conductivity, the materials are not particularly limited. However, various electrically-conductive materials such as a metallic material such as copper, aluminum, or alloy containing these, a carbon-based material such as carbon black, an electronically-conductive polymer material such as polyacetylene, polypyrrole, or derivatives thereof, an ion-conductive polymer material in which ionic substance such as NaCl, $LiClO_4$, KCl, LiBr, $LiNO_3$, or LiSCN is dispersed in a matrix resin such as polyvinyl alcohol, polycarbonate, or polyethylene oxide, and an electrically-conductive oxide material such as an indium tin oxide (ITO), a fluorine-doped tin oxide (FTO), a tin oxide ($SnO_2$), or an indium oxide (IO) can be given as an example, and of these, one kind or the combination of two or more kinds can be used.

Further, the pixel electrodes 35A and 35B may also be constituted so as to have reflectivity by using paste or the like of metal, silicide, silver, or the like as materials of electrodes which are used for the pixel electrodes 35A and 35B. Further, since the pixel electrodes 35A and 35B are located on the opposite side to the visible side, it is also possible to use a transparent electrode such as an ITO.

Further, as the first substrate 30 and the second substrate 31, an organic insulating substrate other than a PET substrate, an inorganic glass substrate such as thin glass, or a composite substrate composed of an inorganic material and an organic material may also be used.

The electrophoretic layer 32 is sandwiched between the element substrate 300 and the opposite substrate 310 having the configurations described above, and such an electrophoretic layer 32 is configured to include a plurality of negatively-charged blue particles (second electrically-charged particles) 26(B) made of PET and having reflectivity and a plurality of positively-charged red particles (first electrically-charged particles) 27(R) having permeability, which are retained in a transparent dispersion medium 21 made of silicone oil.

As a material of the dispersion medium 21, a substantially colorless transparent material is preferable. As such a dispersion medium, a dispersion medium having relatively high insulation properties is suitably used. As a material of such a dispersion medium, besides the above, for example, various water (distilled water, pure water, ion-exchanged water, or the like), alcohols such as methanol, ethanol, and butanol, cellosolves such as methyl cellosolve, esters such as methyl acetate and ethyl acetate, ketones such as acetone and methyl ethyl ketone, aliphatic hydrocarbons such as pentane, alicyclic hydrocarbons such as cyclohexane, aromatic hydrocarbons such as benzenes having long-chain alkyl group, such as benzene and toluene, halogenated hydrocarbons such as methylene chloride and chloroform, aromatic heterocycles such as pyridine and pyrazine, nitriles such as acetonitrile and propionitrile, amides such as N,N-dimethylformamide, mineral oils such as carboxylate and liquid paraffin, vegetable oils such as linoleic acid, linolenic acid, and oleic acid, silicone oils such as dimethyl silicone oil, methylphenyl silicone oil, and methyl hydrogen silicone oil, fluorinated liquid such as hydrofluoroether, various other oils, or the like can be given, and they can be used alone or as a mixture. As the dispersion medium 21, gas or vacuum may also be used.

Further, as necessary, for example, various additives such as a charge control agent composed of particles of an electrolyte, a surfactant, metallic soap, a resin material, a rubber material, oils, varnish, a compound, or the like, a coupling agent such as a titanium-based coupling agent, an aluminum-based coupling agent, or a silane-based coupling agent, a dispersant, a lubricant, and a stabilizer may also be added to the dispersion medium 21.

As an electrically-charged particle, a non-charged particle, and a transparent particle which are contained in the dispersion medium 21, any type of material can be used, and although it is not particularly limited, at least one type of particle among a dye particle, a pigment particle, a resin particle, a ceramic particle, a metal particle, a metal oxide particle, and a composite particle of these can be suitably used. These particles have the advantages that manufacturing is easy and also charge control can be relatively easily performed.

As a pigment constituting the pigment particle, for example, a black pigment such as aniline black, carbon black, or titanium black, a white pigment such as a titanium dioxide, an antimony trioxide, a zinc sulfide, or a zinc oxide, an azo pigment such as monoazo, disazo, or polyazo, a yellow pigment such as isoindolinone, chrome yellow, yellow iron oxide, cadmium yellow, or titanium yellow, a red pigment such as quinacridone red or chrome vermilion, a blue pigment such as phthalocyanine blue, Indanthrene blue, Prussian blue, ultramarine blue, or cobalt blue, a green pigment such as phthalocyanine green, a cyan pigment such as ferric ferrocyanide, a magenta pigment such as an inorganic iron oxide, or the like can be given. An inorganic pigment and an organic pigment can also be used. One kind or the combination of two or more kinds of these can be used.

The dye particle can be constituted using a dye in place of the above pigment. In this case, a dye may also be mixed in a white pigment and may also be used being mixed with a colored pigment. For example, a dye such as carbonium-based magenta can also be used.

Further, as a resin material constituting the resin particle, for example, acrylic-based resin, urethane-based resin, urea-based resin, epoxy-based resin, rosin resin, polystyrene, polyester, AS resin in which styrene and acrylonitrile are copolymerized, or the like can be given. One kind or the combination of two or more kinds of these can be used.

Further, as the composite particle, for example, a particle formed by coating the surface of the pigment particle with a resin material, a particle formed by coating the surface of the resin particle with a pigment, a particle which is constituted by a mixture in which a pigment and a resin material are mixed in an appropriate composition ratio, or the like can be given. Further, as various particles which are contained in the dispersion medium 21, a particle having a structure in which the center of a particle is hollow may also be used. According to such a configuration, in addition to scattering light at the surface of the particle, it is also possible to scatter light on the wall surface constituting the cavity of the inside of the particle, so that it becomes possible to improve light scattering efficiency. Accordingly, it is possible to improve the color-developing properties of white and other colors.

Further, in order to improve the dispersibility of such an electrophoretic particle in the dispersion medium 21, it is possible to make a high molecule having high mutual solubility with the dispersion medium 21 be physically drawn and stuck or chemically bonded to the surface of each particle. Of these, chemically bonding the high molecule is particularly preferable in terms of the problem of a breakaway from the surface of the electrophoretic particle. If such a configuration is made, it acts in a direction in which the apparent specific gravity of the electrophoretic particle becomes small, so that it is possible to improve the affinity, that is, the dispersibility of the electrophoretic particle in the dispersion medium 21.

As such a high molecule, for example, a high molecule having a group having reactivity with the electrophoretic particle and an electrically-chargeable functional group, a high molecule having a group reactivity with the electrophoretic particle and a long-chain alkyl chain, a long-chain ethylene oxide chain, a long-chain fluorinated alkyl chain, a long-chain dimethyl silicon chain, or the like, a high molecule having a group reactivity with the electrophoretic particle, an electrically-chargeable functional group, and a long-chain alkyl chain, a long-chain ethylene oxide chain, a long-chain fluorinated alkyl chain, a long-chain dimethyl silicon chain, or the like, or the like can be given.

In the high molecule as described above, as the group reactivity with the electrophoretic particle, for example, an epoxy group, a thioepoxy group, an alkoxysilane group, a silanol group, an alkylamide group, an aziridine group, an oxazon group, an isocyanate group, or the like can be given, and it is possible to select and use one kind or two or more kinds of these. However, it is preferable if it is selected depending on the kind or the like of the electrophoretic particle which is used.

The average grain diameter of the electrophoretic particles is not particularly limited. However, a grain diameter in a range of 0.01 µm to 10 µm is preferable and a grain diameter in a range of 0.02 µm to 5 µm is more preferable.

On a peripheral portion of the element substrate 300 or the opposite substrate 310, a seal material 16 (FIGS. 5A to 5C) disposed so as to surround the entire periphery of the electrophoretic layer 32 (the image display section 5) is formed, and the electrophoretic layer 32 is sealed by the element substrate 300, the opposite substrate 310, and the seal material 16.

Figure 5A:
FIGS. 5A to 5C are cross-sectional views showing formation processes of an electrophoretic layer during the manufacturing of the electrophoretic display device.
Figure 5B:
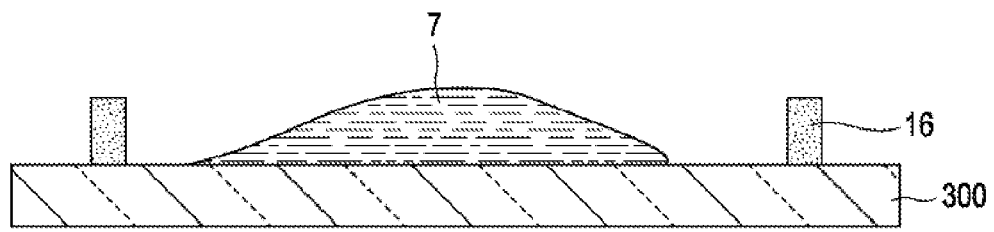
Figure 5C:
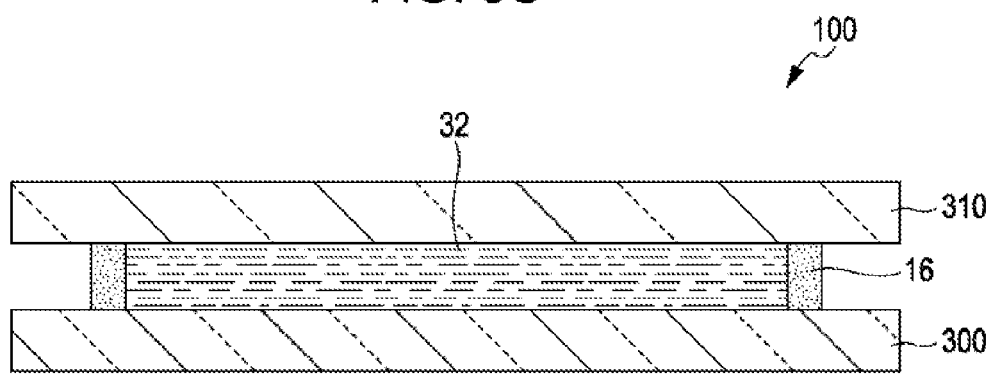

FIGS. 5A to 5C show formation processes of the electrophoretic layer during the manufacturing of the electrophoretic display device.

When forming the electrophoretic layer 32 during manufacturing, the seal material 16 having a given height corresponding to the cell gap is formed into a frame shape in a plan view on the peripheral portion (the non-display section) of the element substrate 300 (FIG. 5A). Next, after an electrophoretic material 7 is dropped onto an area (an image forming area) surrounded by the seal material 16 by a dispenser or the like (FIG. 5B), the opposite substrate 310 is bonded onto the element substrate 300 with the seal material 16 interposed therebetween (FIG. 5C), whereby the electrophoretic display device 100 having the electrophoretic layer 32 between the element substrate 300 and the opposite substrate 310 is completed. Here, the seal material 16 may also be formed on the opposite substrate 310 side, not the element substrate 300 side.

In addition, in this embodiment, a non-capsule type electrophoretic layer 32 is constituted in which the dispersion medium 21 and two-color particles having polarities different to each other, the negatively-charged particles 26(B) and the positively-charged particles 27(R), are enclosed in a space surrounded by the element substrate 300, the opposite substrate 310, and the seal material 16. In this way, it is possible to prevent the lowering of an aperture ratio or the lowering of a contrast due to partition, so that high-contrast, bright and sharp expression becomes possible.

Further, in addition to the configuration described above, for example, a capsule type electrophoretic layer is also acceptable which is formed by disposing a plurality of microcapsules each having the dispersion medium 21 and the electrically-charged particles 26 and 27 enclosed therein, between the element substrate 300 and the opposite substrate 310. Further, a configuration is also acceptable in which the electrophoretic material (the dispersion medium 21 and the electrically-charged particles 26 and 27) are enclosed in each of areas divided by partition walls provided between the element substrate 300 and the opposite substrate 310.

Next, an operating principle of the electrophoretic display device related to this embodiment will be described.

Figure 6:
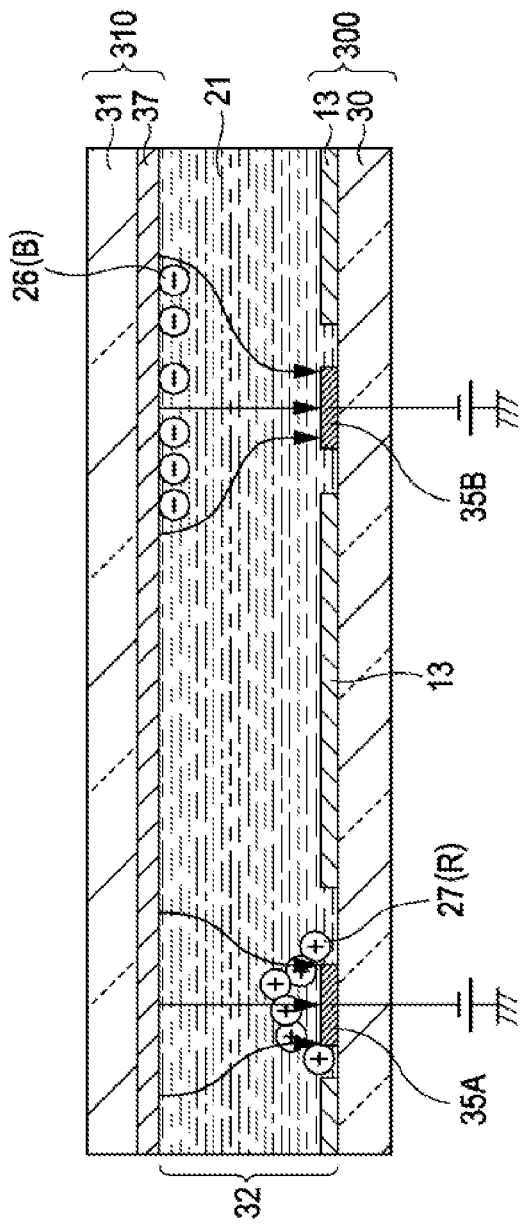
FIG. 6 is a diagram illustrating an operating principle of the electrophoretic display device.

FIG. 6 is a diagram illustrating an operating principle of the electrophoretic display device. In addition, in fact, the pixel electrodes and the reflective electrode are formed in different layers. However, in order to facilitate the understanding of explanation, the reflective electrode is shown in the same layer as the pixel electrodes.

Although it is not shown in the drawing, first, negative voltage VL is applied to the pixel electrode 35A, thereby making the positively-charged red particles 27(R) by congregated on the pixel electrode 35A, and positive voltage VH is applied to the pixel electrode 35B, thereby making the negatively-charged blue particles 26(B) be congregated on the pixel electrode 35B.

Next, as shown in FIG. 6, if the negative voltages VL having the same magnitude are respectively applied to the pixel electrode 35A and the pixel electrode 35B, for example, a plurality of positively-charged red particles 27(R) is drawn and stuck onto the pixel electrode 35A and a plurality of negatively-charged blue particles 26(B) is distributed on the opposite electrode 37. On the other hand, if the positive voltages VH having the same magnitude are respectively applied to the pixel electrode 35A and the pixel electrode 35B, for example, a plurality of negatively-charged blue particles 26(B) is drawn and stuck onto the pixel electrode 35B and a plurality of positively-charged red particles 27(R) is distributed on the opposite electrode 37.

In this manner, it is possible to control display by asymmetrically distributing the electrically-charged particles 26 and 27 on the pixel electrodes 35A and 35B side and the opposite electrode 37 side through voltage which is applied to each of the pixel electrodes 35A and 35B.

FIGS. 7A and 7C are conceptual diagrams of the pixel illustrating a difference in gradation by the areas of the colored particles which are visible when viewed from the observation side. Here, for simplicity's sake, a description will be performed using a red particle only.

FIG. 7A shows a state where the positively-charged red particles 27(R) have been drawn and stuck onto the pixel electrode 35A with the negative voltage VL applied thereto. In this state, if the electrophoretic layer 32 is viewed from the opposite substrate 310 side, it is seen as slightly reddish white display due to small dots corresponding to the distribution areas of the red particles on the pixel electrode 35A and a white color that is expressed by the reflected light from the reflective electrode 13.

FIG. 7B shows a state where some of the positively-charged red particles 27(R) drawn and stuck onto the pixel electrode 35A in the state of FIG. 7A have been moved to the opposite electrode 37 side by application of a negative voltage Vl (Vl<VL) to the pixel electrode 35A. In this state, if the electrophoretic layer 32 is viewed from the opposite substrate 310 side, the distribution of the red dots larger than those in the state of FIG. 7A is seen. A pale red display is made over the entire pixel.

FIG. 7C shows a state where all the plurality of positively-charged particles 27(R) in the electrophoretic layer 32 has been moved to the opposite electrode 37 side. In this state, if the electrophoretic layer 32 is viewed from the opposite substrate 310 side, the entire pixel is seen in red.

In this manner, in the electrophoretic display device, a configuration is made such that gradation is controlled by the areas of the colored particles which are visible when the electrophoretic layer 32 is viewed from the opposite substrate 310 side.

Next, a specific operation (a display method) in the electrophoretic display device related to this embodiment will be described.

Figure 8A:
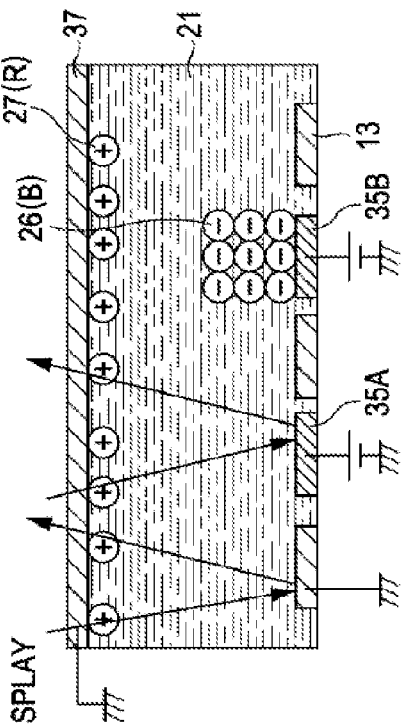
FIG. 8A is a diagram illustrating the distribution states of the particles during white display.

FIG. 8A is a diagram illustrating the distribution states of the particles during white display.

By applying the negative voltage VL to the pixel electrode 35A and also applying the positive voltage VH to the pixel electrode 35B, the positively-charged red particles 27(R) are drawn and stuck onto the pixel electrode 35A and the negatively-charged blue particles 26(B) are drawn and stuck onto the pixel electrode 35B. In the case of this state, light incident on the electrophoretic layer 32 from the opposite substrate 310 side is reflected by the reflective electrode 13 in which the particles are not drawn and stuck, and then emitted from the opposite substrate 310 to the observer side. As a result, bright display, that is, bright white display can be realized.

Here, by constituting the surface of the reflective electrode 13 by an oxide formed by oxidizing the surface, or forming an oxide film on the surface of the reflective electrode 13, it is possible not only to improve reflectance, but also to cause the scattered reflection of the reflected light. As a result, instead of metallic reflection, white display closer to a white color like paper can be realized.

Further, this state is also a preset state when switching a display image of the electrophoretic display device. Since the electrophoretic material has a memory property, it is necessary to reset the distribution states of the particles by performing a preset operation of clearing display in the image display section 5 when rewriting a display image. A rewriting operation of a new display image is from then on performed with the reset state (the preset state) as a standard.

Figure 8B:
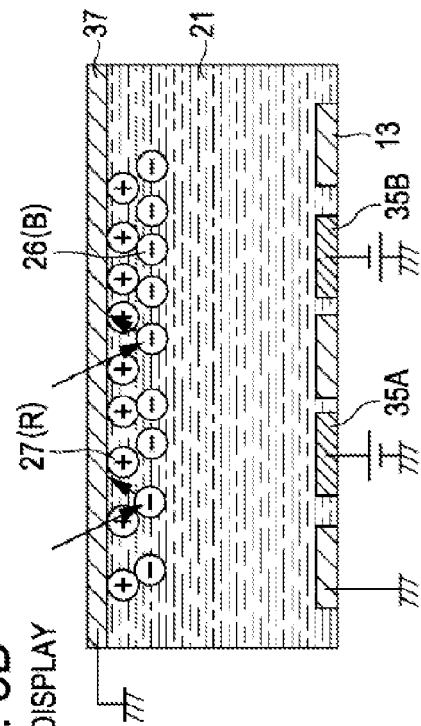
FIG. 8B is a diagram illustrating the distribution states of the particles during red display.

FIG. 8B is a diagram illustrating the distribution states of the particles during red display.

Here, first, the preset state shown in FIG. 8A is set as a standard, and thereafter, the positive voltage VH is applied to the pixel electrodes 35A and 35B. As a result, continuously from the preset state, a state is created where the negatively-charged blue particles 26(B) remain drawn and stuck onto the pixel electrode 35B. Further, all the positively-charged red particles 27(R) drawn and stuck onto the pixel electrode 35A in the preset state move to the opposite electrode 37 side.

Here, since the positively-charged red particle 27(R) is a transparent particle (a transmissive particle), light incident from the opposite substrate 310 side penetrates the positively-charged particles 27(R), is then reflected by the reflective electrode 13 on the element substrate 300 side, penetrates the positively-charged particles 27(R) again, and is then emitted to the outside. At this time, lights other than a red light are absorbed in the positively-charged red particles 27(R) and only the red light is emitted from the opposite substrate 310 side to the outside. The brightness of the emitted light (a display image) at this time is proportional to the area of the reflective electrode 13. For this reason, it is preferable that reflectivity be also imparted to areas where the pixel electrodes 35A and 35B are present. That is, similarly to the reflective electrode 13, the surfaces of the pixel electrodes 35A and 35B may also be constituted by an oxide of metal and an oxide film may also be separately formed on the surface of a metal layer.

Here, the transparent particle is a particle that absorbs light of a specific wavelength region in a visible light region and scatters or transmits lights of the other wavelengths. In this embodiment, it scatters or transmits red light in a range of about 600 nm to 800 nm. In addition, regions other than visible light are overlooked. Further, in terms of color development or contrast, it is preferable that absorption of the light of a specific wavelength is large, and at least 80% or more, preferably, 90% or more is suitable.

Figure 8C:
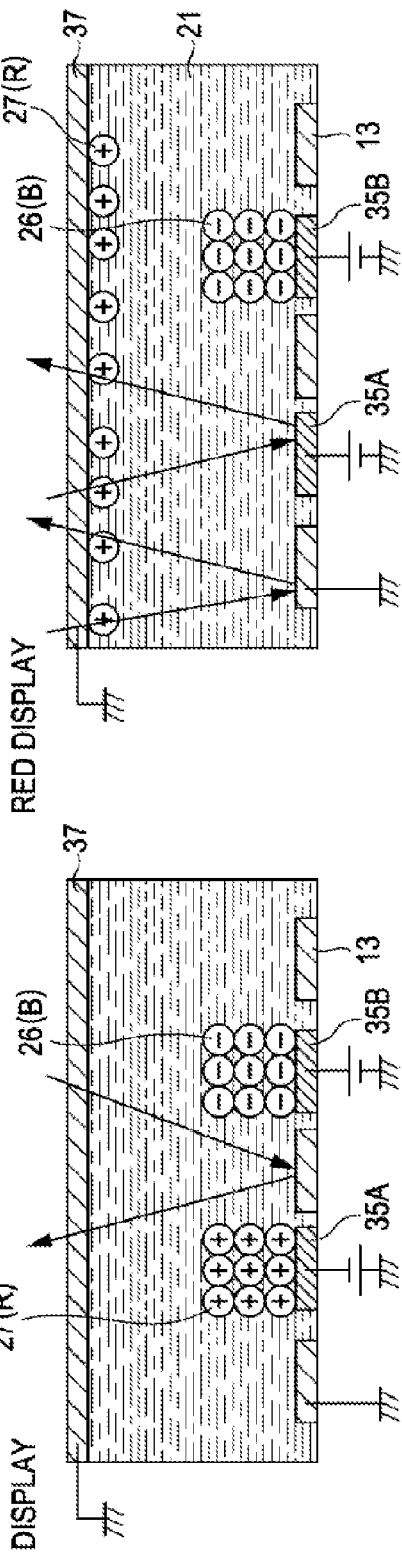
FIG. 8C is a diagram illustrating the distribution states of the particles during blue display.

FIG. 8C is a diagram illustrating the distribution states of the particles during blue display.

Also when performing blue display, it is performed with the preset state shown in FIG. 8A as a standard.

After the preset, the negative voltage VL is applied to each of the pixel electrode 35A and the pixel electrode 35B, thereby making the positively-charged red particles 27(R) remain retained on the pixel electrode 35A and also moving all the negatively-charged blue particles 26(B) drawn and stuck onto the pixel electrode 35B in the time of the preset to the opposite electrode 37 side, whereby blue display is made.

The negatively-charged blue particle 26(B) is a reflective particle and light incident from the opposite substrate 310 side is reflected by the negatively-charged particle 26(B). At this time, lights other than a blue light are absorbed in the negatively-charged particles 26(B) and only the blue light is reflected by the negatively-charged particles 26(B) and then emitted from the opposite substrate 310. The brightness of the blue display at this time is proportional to the effective distribution areas of the negatively-charged blue particles 26(B) distributed on the opposite electrode 37. For this reason, it is preferable to two-dimensionally or three-dimensionally distribute the blue particles on the opposite electrode 37 in the range (thickness) of making sufficient reflection of the blue light be performed.

It is preferable that the reflectance of the blue light in the negatively-charged blue particle 26(B) be as high as possible, and reflectance of at least 60% or more, more preferably, 90% or more is suitable. Further, with respect to the reflectance of light other than the blue light, the lower, the better, and preferably, 10% or less, more preferably, 5% or less is suitable.

Further, it is preferable that a component of diffuse reflection (irregular reflection) be included at least in reflection. Here, the reflective particle refers to a particle that absorbs light of a specific wavelength region in a visible light region and scatters or reflects lights of the other wavelengths. In this embodiment, it scatters or reflects blue light having a wavelength in a range of about 400 nm to 500 nm. In addition, regions other than the visible light region are overlooked.

Figure 8D:
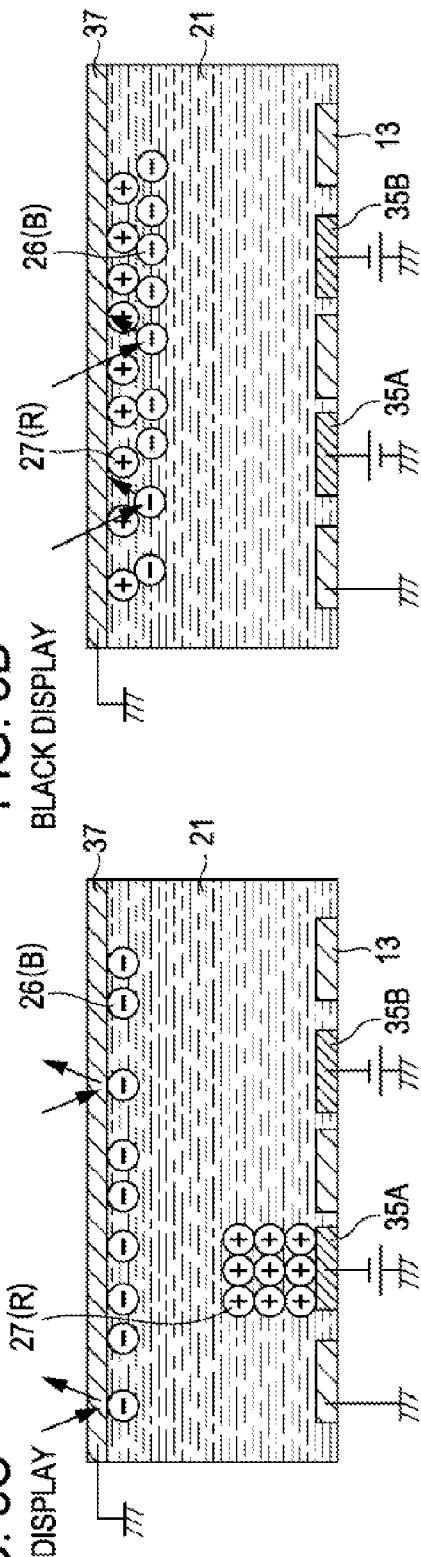
FIG. 8D is a diagram illustrating the distribution states of the particles during black display.

FIG. 8D is a diagram illustrating the distribution states of the particles during black display.

Also when performing black display, it is performed with the preset state shown in FIG. 8A as a standard.

After the preset, first, the positive voltage VH is applied to the pixel electrode 35A, thereby moving the positively-charged red particles 27(R) onto the opposite electrode 37. As a result, a plurality of positively-charged particles 27(R) is distributed so as to cover the surface of the opposite electrode 37.

After the positive voltage VH is applied to the pixel electrode 35A, continuously, the negative voltage VL is applied to the pixel electrode 35B, thereby moving the negatively-charged blue particles 26(B) to the opposite electrode 37 side. The negatively-charged blue particles 26(B) moved to the opposite electrode 37 side are disposed below the positively-charged red particles 27(R) distributed on the surface of the opposite electrode 37, thereby being three-dimensionally distributed so as to overlap with the positively-charged particles 27(R). In this manner, after the positively-charged red particles 27(R) are disposed just below the opposite electrode 37, the negatively-charged particles 26(B) are disposed just below the positively-charged particles 27(R), whereby black display is made.

In light incident from the opposite substrate 310, some of the lights other than red light are first absorbed in the positively-charged red particles 27(R) that are the transmissive particles and only the red light reaches the negatively-charged blue particles 26(B). Then, the red light is absorbed in the negatively-charged blue particles 26(B). Further, in external light which has directly reached the negatively-charged particles 26(B) without penetrating the positively-charged red particles 27(R), only blue light of the external light is reflected by the negatively-charged particles 26(B) and lights of the other colors are absorbed in the negatively-charged particles 26(B). The blue light reflected by the negatively-charged particles 26(B) is absorbed in the positively-charged red particles 27(R). In this way, the display is made black.

Next, display when gradation control by the red particles and the blue particles has been performed is shown.

Figure 9A:
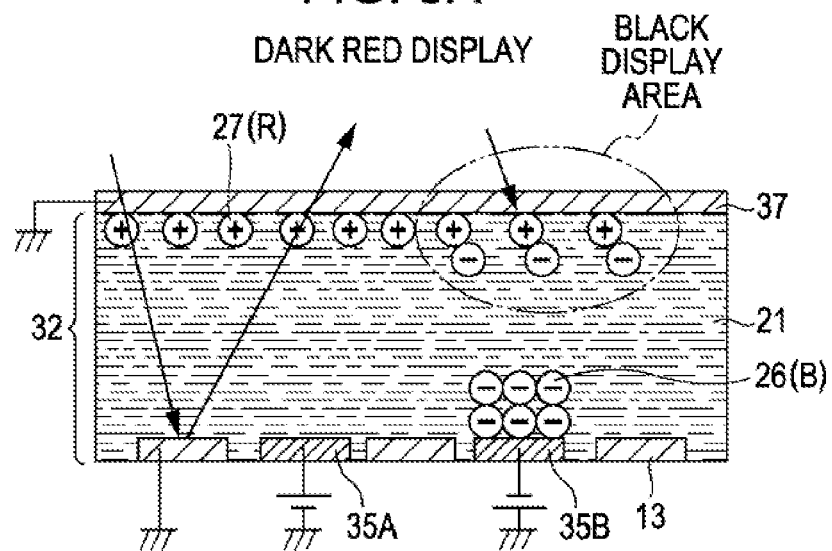
FIGS. 9A and 9B are diagrams illustrating the distribution states of the particles during dark red display.
Figure 9B:
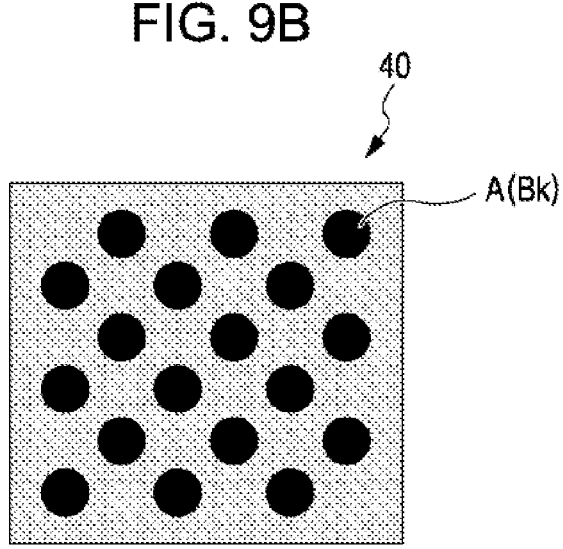

FIGS. 9A and 9B are diagrams illustrating the distribution states of the particles during dark red display.

First, the preset state shown in FIG. 8A is set as a standard, and thereafter, the positive voltage VH is applied to the pixel electrode 35A, thereby moving the positively-charged red particles 27(R) to the opposite electrode 37 side. Thereafter, a negative voltage Vl1 (VL<Vl1<0) is applied to the pixel electrode 35B, thereby moving some of the negatively-charged blue particles 26(B) drawn and stuck onto the pixel electrode 35B during preset to the opposite electrode 37 side, to be disposed just below the positively-charged red particles 27(R) which are widely distributed on the surface of the opposite electrode 37. Some areas where the positively-charged red particles 27(R) and the negatively-charged blue particles 26(B) are three-dimensionally distributed become black dots. For this reason, if the electrophoretic layer 32 is viewed from the opposite substrate 310 side, a plurality of black dot display areas is mixed and disposed in a red display area, whereby dark red display is made.

In this manner, by controlling the areas of the black display area and the red display area by the distribution ranges of the red particles and the blue particles, it is possible to express optional brightness.

The control of the distribution area of each particle is performed by the magnitude, the application time, or the application timing of voltage which is applied to each of the pixel electrodes 35A and 35B. For example, when the positively-charged red particles 27(R) started to move in first has not yet reached the opposite electrode 37, movement of the negatively-charged blue particles 26(B) may also be started.

Further, each area in the red display area and the black display area is an effective area that is observed from the opposite substrate 310 side, considering all the two-dimensional and three-dimensional spreads of the electrically-charged particle of each color on the opposite substrate 310 side (on the opposite electrode 37).

Here, the black display applies gradation display of a blue color.

Gradation display can be performed because each pixel is composed of an aggregate of a plurality of pixel electrodes 35A and 35B and the respective pixel electrodes 35A and 35B are independently controlled by the respective selection transistors TR1 and TR2.

Figure 10:
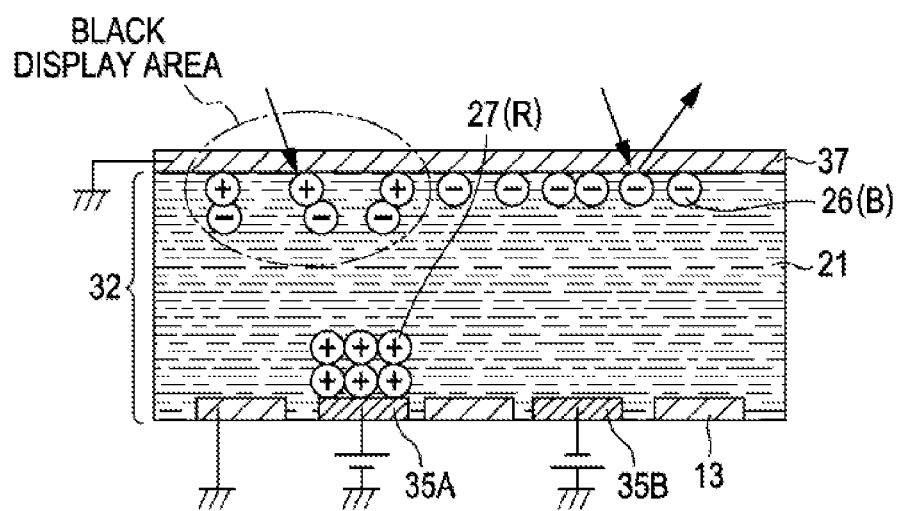
FIG. 10 is a diagram illustrating the distribution states of the particles during dark blue display.

FIG. 10 is a diagram illustrating the distribution states of the particles during dark blue display.

After the preset operation shown in FIG. 8A is carried out, a positive voltage Vh1 (0<Vh1<VH) is applied to the pixel electrode 35A, thereby moving some of the positively-charged red particles 27(R) drawn and stuck onto the pixel electrode 35A at the preset to the opposite electrode 37 side. Thereafter, the negative voltage VL is applied to the pixel electrode 35B, thereby moving all the negatively-charged blue particles 26(B) drawn and stuck onto the pixel electrode 35B to the opposite electrode 37 side. Since the areas where the positively-charged red particles 27(R) and the negatively-charged blue particles 26(B) are three-dimensionally distributed become black dots, if the electrophoretic layer 32 is viewed from the opposite substrate 310 side, a plurality of black dot areas A(Bk) is mixed and disposed in a blue display area, whereby dark blue display is made.

Figure 11A:
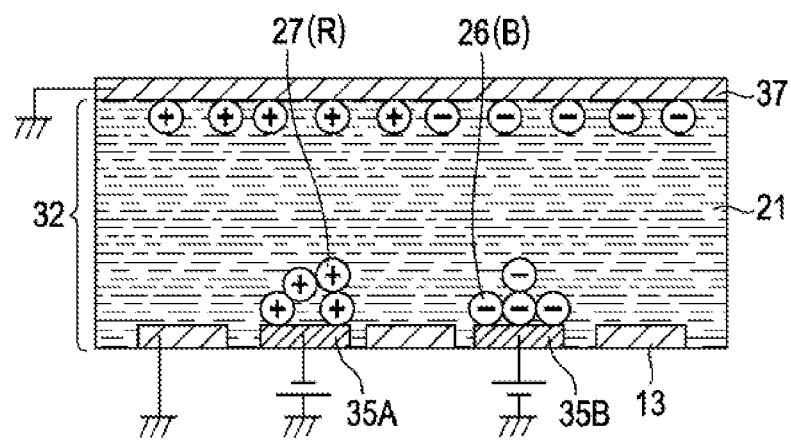
FIGS. 11A and 11B are diagrams illustrating the distribution states of the particles during magenta display.
Figure 11B:
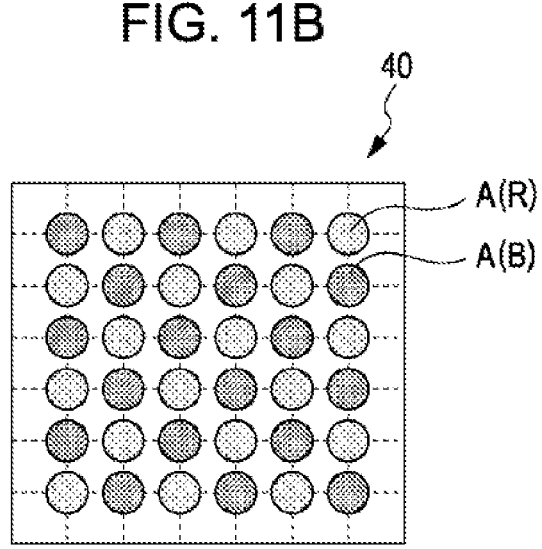

FIGS. 11A and 11B are diagrams illustrating the distribution states of the particles during magenta display.

After the preset operation shown in FIG. 8A is carried out, a positive voltage Vh2 (0<Vh2<VH) is applied to the pixel electrode 35A and at the same time, a negative voltage Vl2 (VL<Vl2<0) is applied to the pixel electrode 35B. As a result, red dot areas A(R) and blue dot areas A(B) are mixed and disposed, so that magenta display can be obtained. Here, the given voltages are simultaneously applied to the respective pixel electrodes 35A and 35B, thereby reducing the overlaps of the particles of each color to reduce black display.

In addition, the timings of applying voltages to the respective pixel electrodes 35A and 35B are not limited to the same timing. Further, color tone can be controlled by changing the areas of the red dot area A(R) and the blue dot area A(B).

Figure 12A:
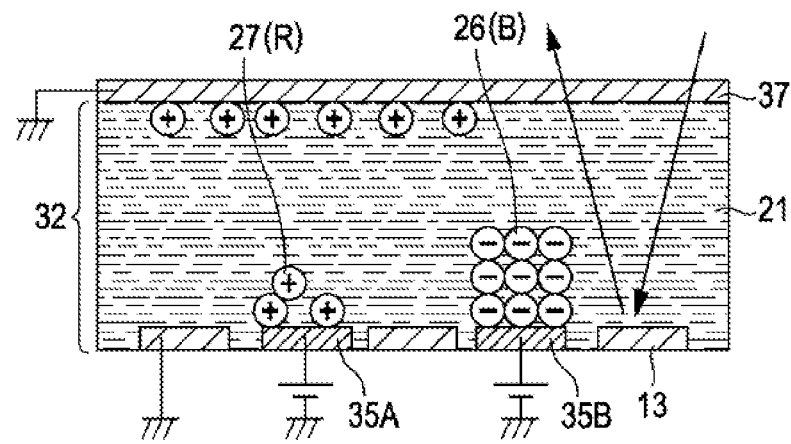
FIGS. 12A and 12B are diagrams illustrating the distribution states of the particles during pale red display.
Figure 12B:
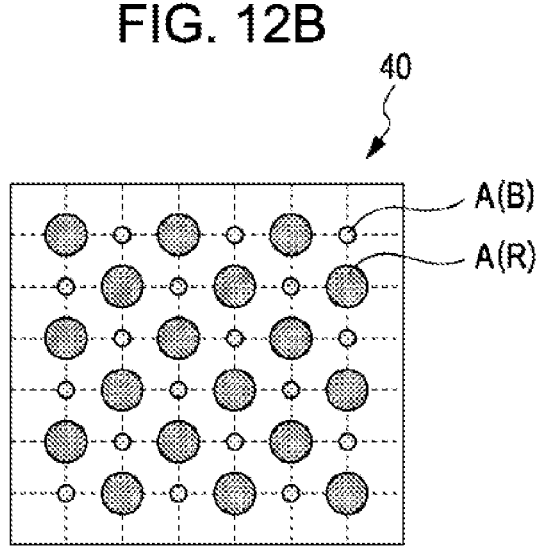

FIGS. 12A and 12B are diagrams illustrating the distribution states of the particles during pale red display.

After the preset operation shown in FIG. 8A is carried out, a positive voltage Vh3 (0<Vh3<VH) is applied to the pixel electrode 35A and the negative voltage VL is applied to the pixel electrode 35B. In this way, a plurality of positively-charged red particles 27(R) is moved to the opposite electrode 37 side. Areas which are not covered by the positively-charged particles 27(R) turn into white display. For this reason, white display areas A(W) and red dot areas A(R) are mixed and disposed, so that red display having low saturation can be obtained.

Figure 13:
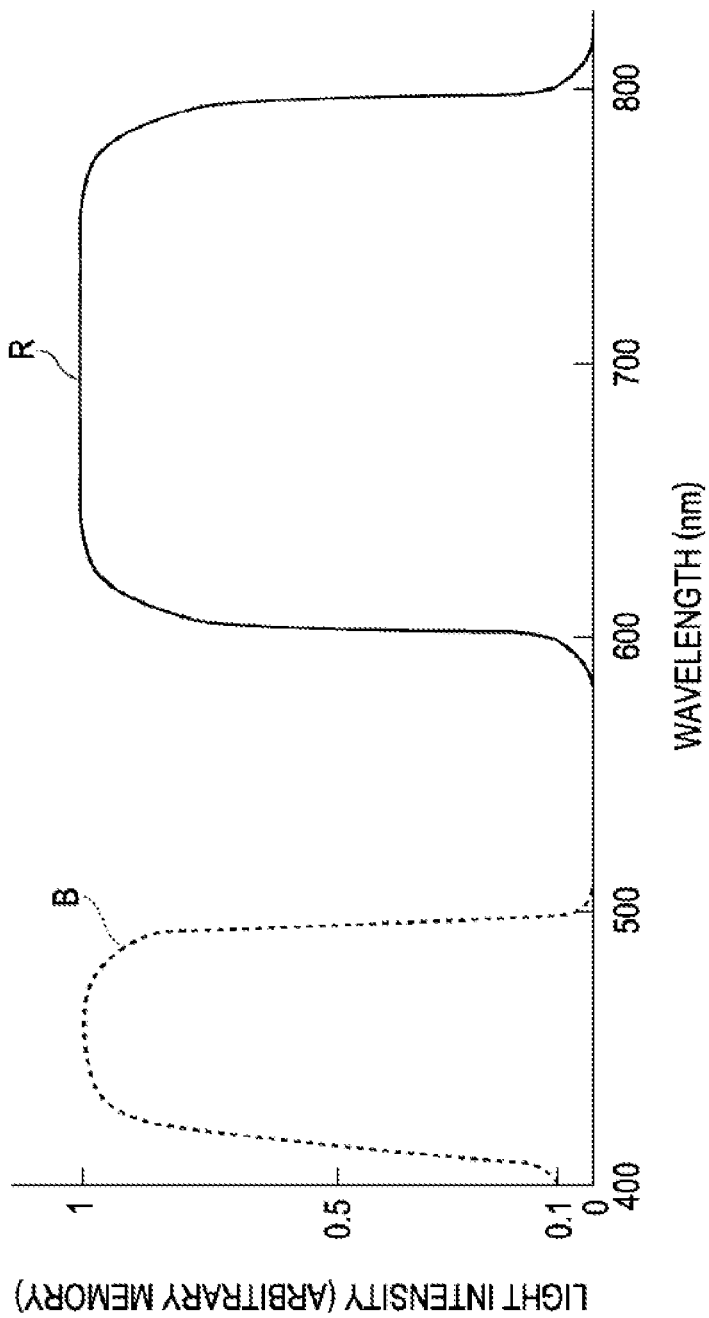
FIG. 13 is a distribution diagram of a wavelength and a light intensity after visuality factor correction.

FIG. 13 is a distribution conceptual diagram of a wavelength and light intensity after luminosity factor correction.

As shown in FIG. 13, reflection spectra do not overlap in the transparent particle of a red color and the reflective particle of a blue color. Since light having an overlapping wavelength is emitted to the outside without being absorbed in any of the red particle and the blue particle, excellent black display cannot be realized. It is preferable that the intensity of the light having an overlapping wavelength be 10% or less of the maximum value of each of the other light intensities (the intensities of the red light and the blue light). Further, in order to obtain excellent black display, 2% or less is preferable.

As described so far, in the electrophoretic display device 100 related to this embodiment, it is possible to obtain five color display, white display, black display, red display, blue display, and magenta display (a mixed color of the colors of a red particle and a blue particle), in one pixel. Further, since adjustment of brightness or saturation can also be performed by controlling gradation in each display color, it is possible to obtain color display of five or more colors and expression almost close to full color becomes possible. Accordingly, a variety of expressions can be realized.

Further, some of the light incident from the opposite substrate 310 side is reflected by the reflective electrode, so that brighter display becomes possible and in particular, it is also possible to realize white display closer to paper.

Further, the electrophoretic layer 32 has two types of electrically-charged particles 26(B) and 27(R) that are the transmissive particle and the reflective particle having wavelength regions different from each other, so that during black display, it is possible to reduce light that is leaked to the outside without being absorbed in any of the respective particles. Accordingly, it is possible to realize clear and excellent black display.

Further, in this embodiment, since the electrophoretic layer 32 is constituted without using microcapsules or partitions such as partition walls, the lowering of an aperture ratio or the lowering of a contrast due to such partitions does not occur, so that high-contrast, bright, and sharp expression becomes possible.

Next, a specific driving method of the electrophoretic display device will be described.

In the following description, 0 V means GND voltage or Vcom.

Figure 14:
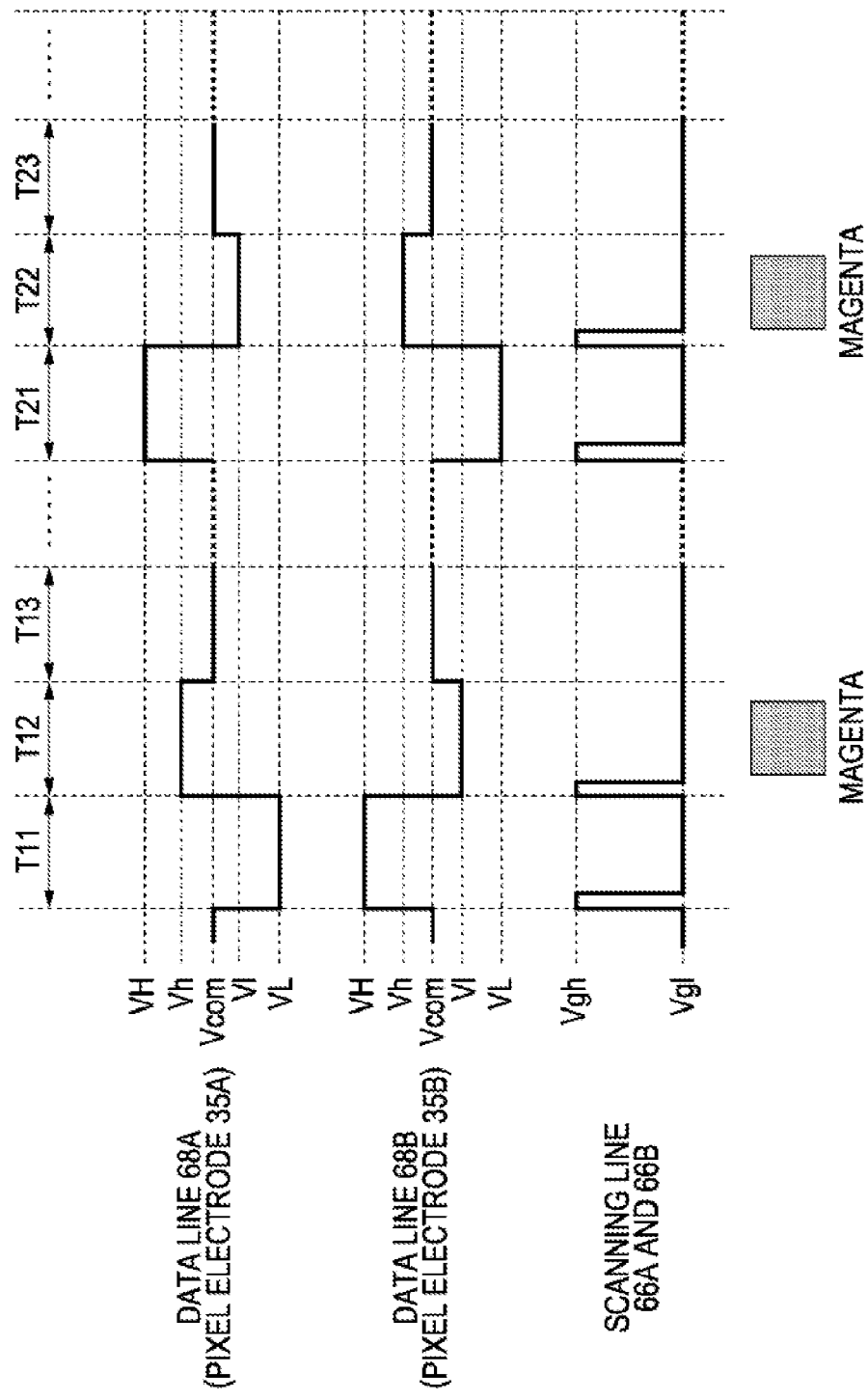
FIG. 14 is a timing chart illustrating a driving method when magenta display is continuously performed.

FIG. 14 is a timing chart illustrating a driving method when magenta display is continuously performed. The opposite electrode 37 has Vcom.

First, a first preset operation is carried out.

In a preset period T11, by applying a selection voltage Vgh to the scanning lines 66A and 66B, thereby applying the negative voltage VL to the pixel electrode 35A through the data line 68A and also applying the positive voltage VH to the pixel electrode 35B through the data line 68B, the electrically-charged particles 27(R) and 26(B) are respectively congregated on the respective pixel electrodes 35A and 35B. As a result, white display is made and a reset state is created.

Next, in a write period T12, by applying the positive voltage Vh (0<Vh<VH) to the pixel electrode 35A and at the same time, applying the negative voltage Vl (VL<Vl<0) to the pixel electrode 35B, some of the positively-charged red particles 27(R) drawn and stuck onto the pixel electrode 35A are moved to the opposite electrode 37 side and at the same time, some of the negatively-charged blue particles 26(B) drawn and stuck onto the pixel electrode 35B are moved to the opposite electrode 37 side. Here, as shown in FIG. 11B, the distribution area of the negatively-charged blue particles 26(B) and the distribution area of the positively-charged red particles 27(R) on the opposite electrode 37 are approximately the same, and accordingly, mixed-color display of a red color and a blue color, that is, magenta display is made.

Thereafter, in an image retention period T13, the respective data lines 68A and 68B and the respective pixel electrodes 35A and 35B turn into 0 V, so that the distribution states of the respective electrically-charged particles 26(B) and 27(R), that is, the display state of the pixel is maintained.

In addition, if a power switch of the electrophoretic display device is turned on, a GND potential is input to each of the data lines 68A and 68B and each of the electrodes 35A, 35B, and 37, and if the power switch is turned off, a floating state is created.

Next, a second preset operation is carried out.

This preset operation is carried out when rewriting an image, and even in the case of performing continuous display, the operation is performed in the same way.

For example, in a case where magenta display is continuously performed, voltages having polarities different from those during the previous preset operation are applied to the respective pixel electrodes 35A and 35B. That is, the polarities of the voltages applied to the respective pixel electrodes 35A and 35B during the previous preset operation are reversed by applying the positive voltage VH to the pixel electrode 35A and also applying the negative voltage VL to the pixel electrode 35B. As a result, the respective electrically-charged particles 26(B) and 27(R) are congregated on the respective pixel electrodes 35A and 35B, so that display is reset.

Next, in a write period T22, by applying the negative voltage Vl (VL<Vl<0) to the pixel electrode 35A and at the same time, applying the positive voltage Vh (0<Vh<VH) to the pixel electrode 35B, some of the negatively-charged blue particles 26(B) drawn and stuck onto the pixel electrode 35A are moved to the opposite electrode 37 side and some of the positively-charged red particles 27(R) drawn and stuck onto the pixel electrode 35B are also moved to the opposite electrode 37 side. As a result, magenta display is made in the same way as the previous display.

Thereafter, in an image retention period T23, the respective data lines 68A and 68B and the respective pixel electrodes 35A and 35B turn into 0 V, so that the distribution states of the respective particles 26(B) and 27(R), that is, the display state of the pixel is maintained.

Although it is not shown in the drawing, in the image retention periods T13 and T23, 0 V may also be written from the data lines 68A and 68B to the pixel electrodes 35A and 35B by making the selection transistors TR1 and TR2 be in conduction states.

Next, a driving method when black display is continuously performed will be described. Here, the electric potential of the opposite electrode 37 is Vcom.

FIG. 15 is a timing chart illustrating a driving method when the black display is continuously performed.

First, in the preset period T11, by applying the selection voltage Vgh (the voltage of making the selection transistors TR1 and TR2 be ON) to the scanning lines 66A and 66B, the negative voltage VL is applied to the pixel electrode 35A through the data line 68A and also the positive voltage VH is applied to the pixel electrode 35B through the data line 68B. As a result, the electrically-charged particles 27(R) and 26(B) are respectively congregated on the respective pixel electrodes 35A and 35B.

Next, in the write period T12, first, by applying the positive voltage VH to the pixel electrode 35A and at the same time, setting the pixel electrode 35B to be 0 V (Vcom), the positively-charged red particles 27(R) drawn and stuck onto the pixel electrode 35A are moved to the opposite electrode 37 side and also the retention state of the negatively-charged blue particles 26(B) on the pixel electrode 35B is maintained.

Then, at a given time ("write time difference" in the drawing) after the start of the movement operation of the positively-charged red particles 27(R) to the opposite electrode 37 side, the negative voltage VL is applied to the pixel electrode 35B. Accordingly, all the negatively-charged blue particles 26(B) drawn and stuck onto the pixel electrode 35B are moved to the opposite electrode 37 side, thereby being disposed below the positively-charged red particles 27(R) distributed on the surface of the opposite electrode 37 in advance. As a result, black display is made.

Thereafter, in the image retention period T13, the data lines 68A and 68B and the respective pixel electrodes 35A and 35B turn into 0 V, so that the distribution states of the respective particles 26(B) and 27(R), that is, the display state of the pixel is maintained.

In addition, if the power switch of the electrophoretic display device is turned on, the GND potential is input to the respective data lines 68A and 68B and the respective electrodes 35A, 35B, and 37, and if the power switch is turned off, a floating state is created.

Next, the preset period T21 is carried out.

Here, by applying the selection voltage Vgh to the scanning lines 66A and 66B, voltages having polarities different from those during the previous preset operation are applied to the respective pixel electrodes 35A and 35B through the data lines 68A and 68B. That is, the polarities of the voltages applied to the respective pixel electrodes 35A and 35B during the previous preset operation are reversed by applying the positive voltage VH to the pixel electrode 35A and also applying the negative voltage VL to the pixel electrode 35B. As a result, the respective electrically-charged particles 26(B) and 27(R) are congregated on the respective pixel electrodes 35A and 35B, so that display is reset.

Next, in the write period T22, first, by applying the positive voltage VH to the pixel electrode 35B and at the same time, setting the pixel electrode 35A to be 0 V, the negatively-charged blue particles 26(B) drawn and stuck onto the pixel electrode 35B are moved to the opposite electrode 37 side and also the retention state of the positively-charged red particles 27(R) on the pixel electrode 35A is maintained.

Then, at a given time ("write time difference" in the drawing) after the start of the movement operation of the negatively-charged blue particles 26(B) to the opposite electrode 37 side, the negative voltage VL is applied to the pixel electrode 35A. Accordingly, some of the negatively-charged blue particles 26(B) drawn and stuck onto the pixel electrode 35A are moved to the opposite electrode 37 side, thereby being disposed below the positively-charged red particles 27(R) distributed on the surface of the opposite electrode 37 in advance. As a result, black display is made.

Thereafter, in the image retention period T23, the respective data lines 68A and 68B and the respective pixel electrodes 35A and 35B turn into 0 V, so that the distribution states of the respective electrically-charged particles 26(B) and 27(R), that is, the display state of the pixel is maintained.

Here, an operation of reversing the polarities of voltages which are applied to the respective pixel electrodes 35A and 35B, in the preset operation which is carried out when switching display, may also be performed for every rewriting of plural screens.

Further, the method of providing a difference at the timings of applying the voltages to the pixel electrodes 35A and 35B in the write periods T12 and T22 is not limited to the above method. For example, a field to which the red particles move and a field to which the blue particles move may also be made different from each other. Further, the stacking sequence of the red particle and the blue particle on the opposite substrate may also be controlled by controlling the movement speeds of the particles by changing the absolute values or the application times of the voltages which are applied to the pixel electrodes 35A and 35B between the pixel electrodes 35A and 35B.

In addition, in the above preset periods T11 and T21, a method of writing image data by sequentially selecting the scanning lines has been used. However, a method of simultaneously writing image data to all the scanning lines by selecting all the scanning lines provided on the entire screen together in a batch may also be used.

Further, a method in which a plurality of scanning lines is simultaneously selected and image data is written together in a batch for every plural scanning lines may also be used.

Further, although it is not shown in FIGS. 14 and 15, the movement of the electrically-charged particles 26(B) and 27(R) may also be controlled by applying, for example, the voltage of any one of the pixel electrodes 35A and 35B or the same voltage as that of the opposite electrode 37 to the reflective electrode 13.

At the time of the "write time difference" in the periods T12 and T22 in FIG. 15, Vcom is applied to the pixel electrodes 35A and 35B which release the blue particles. However, it is not limited to the voltage. Provided that it is voltage to hold the blue particles congregated on the pixel electrodes 35A and 35B, any voltage is acceptable.

Further, the driving method of the electrophoretic display device 100 is not limited to the above and it is possible to use other driving methods.

Next, other driving methods when black display is performed will be described.

MODIFIED EXAMPLE 1

Figure 16A:
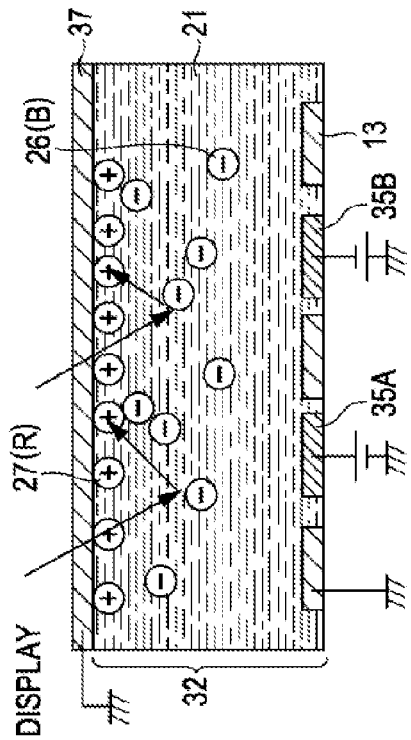
FIG. 16A is a diagram illustrating the distribution states of electrically-charged particles during black display in Modified example 1.

FIG. 16A is a diagram illustrating the distribution states of the electrically-charged particles during black display in Modified example 1.

Here, after the preset operation is performed by applying voltages having polarities different from each other to the respective pixel electrodes 35A and 35B, voltages having the opposite polarities to those during the preset operation are simultaneously applied to the pixel electrodes 35A and 35B. In this way, the electrically-charged blue and red particles 26(B) and 27(R) are mixed and disposed on the opposite electrode 37 side. The electrically-charged blue and red particles 26(B) and 27(R) are three-dimensionally present in a random manner on the opposite electrode 37 and in the vicinity thereof, whereby external light incident from the opposite substrate 310 side is absorbed in the respective electrically-charged particles 26(B) and 27(R), so that the display is made black. In addition, since the reflected light by the negatively-charged blue particles 26(B) contacting the opposite electrode 37 is visible, a somewhat bluish display color is obtained. However, it is possible to perform display close to a black.

MODIFIED EXAMPLE 2

Figure 16B:
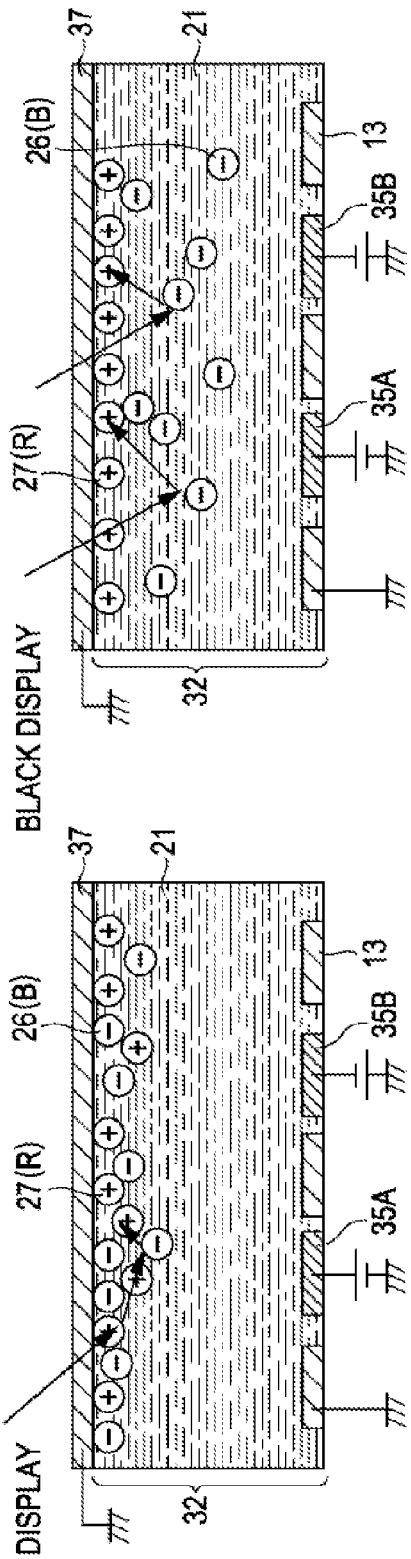
FIG. 16B is a diagram illustrating the distribution states of the electrically-charged particles during black display in Modified example 2.

FIG. 16B is a diagram illustrating the distribution states of the electrically-charged particles during black display in Modified example 2.

Here, after the preset operation is performed by applying voltages having polarities different from each other to the respective pixel electrodes 35A and 35B, first, voltage (for example, a positive voltage) having the opposite polarity to that during the preset operation is applied to the pixel electrode 35A, thereby moving all the positively-charged red particles 27(R) to the opposite electrode 37 side. Next, a given voltage is applied to the pixel electrode 35B, thereby making the negatively-charged blue particles 26(B) float in the dispersion medium 21. Even in this state, black display is possible.

MODIFIED EXAMPLE 3

Figure 16C:
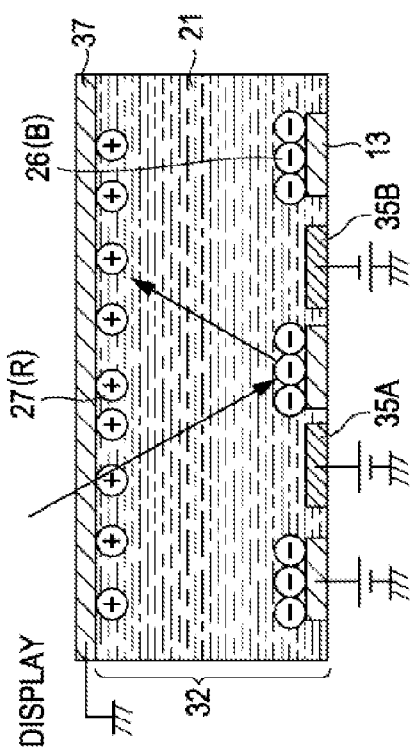
FIG. 16C is a diagram illustrating the distribution states of the electrically-charged particles during black display in Modified example 3.

FIG. 16C is a diagram illustrating the distribution states of the electrically-charged particles during black display in Modified example 3.

In the write period after the preset operation, a positive voltage is applied to the reflective electrode 13 simultaneously with applying a positive voltage to the pixel electrode 35A and a negative voltage to the pixel electrode 35B. In this case, the positively-charged red particles 27(R) move to the opposite electrode 37 side and the negatively-charged blue particles 26(B) move to the reflective electrode 13 side. Since the moving directions of both the electrically-charged particles 26(B) and 27(R) during voltage application are different from each other, it is possible to simultaneously move both the electrically-charged particles 26(B) and 27(R).

For example, after the preset operation is performed by applying the negative voltage VL to the pixel electrode 35A and also applying the positive voltage VH to the pixel electrode 35B, by applying the GND potential to the opposite electrode 37 and applying a positive voltage (for example, the positive voltage VH) to the pixel electrode 35A, the positively-charged red particles 27(R) are moved to the opposite electrode 37 side. Further, by applying the negative voltage VL to the pixel electrode 35B and also applying a positive voltage (for example, a higher voltage than the positive voltage VH) to the reflective electrode 13, the negatively-charged blue particles 26(B) drawn and stuck onto the pixel electrode 35B are moved onto the reflective electrode 13.

Accordingly, lights other than red light of external light incident from the opposite substrate 310 side are absorbed in the positively-charged particles 27(R) and only the red light is incident on and absorbed to the negatively-charged blue particles 26(B) drawn and stuck onto the reflective electrode 13. Further, in external light directly incident on the negatively-charged particles 26(B) without being absorbed in the positively-charged particles 27(R), lights other than blue light of the external light are absorbed and only the blue light is reflected. The blue light reflected by the negatively-charged particles 26(B) is absorbed in the positively-charged red particles 27(R). As a result, black display is made.

MODIFIED EXAMPLE OF RED DISPLAY

Figure 17A:
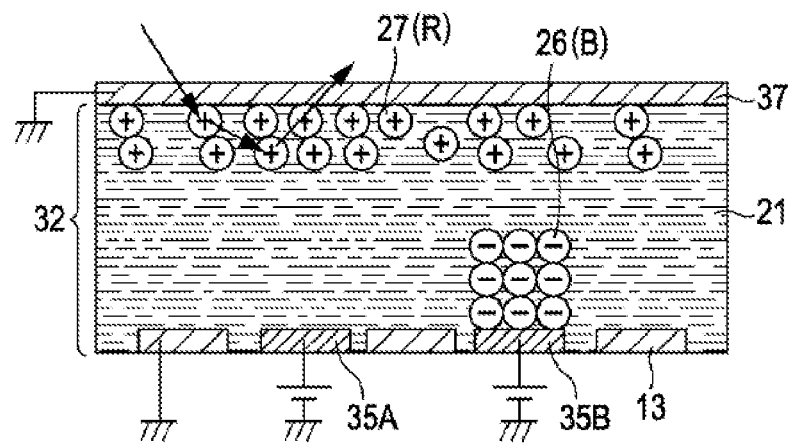
FIGS. 17A and 17B are diagrams illustrating the distribution states of the electrically-charged particles in a modified example of a driving method during red display.

FIG. 17A is a diagram illustrating the distribution states of the electrically-charged particles in a modified example of a driving method of a modified example of red display.

Here, the number of positively-charged particles 27(R) which are retained in the electrophoretic layer 32 has been increased.

After the preset operation is performed, by applying the negative voltage VL to the pixel electrode 35A and also applying the positive voltage VH to the pixel electrode 35A, the positively-charged red particles 27(R) increased in amount are distributed on the opposite electrode 37 in a multilayer state so as to overlap each other.

Then, light incident from the opposite substrate 310 side is made different in direction at any time when penetrating a number of positively-charged particles 27(R) and finally emitted from the opposite substrate 310 side. This is an action similar to scattered reflection, and as a result, bright red display can be obtained. That is, light penetrates a plurality of red particles, thereby causing scattered reflection without directivity, and this phenomenon occurs in the vicinity of the opposite electrode 37, so that red display having a wide viewing angle is made.

Figure 17B:
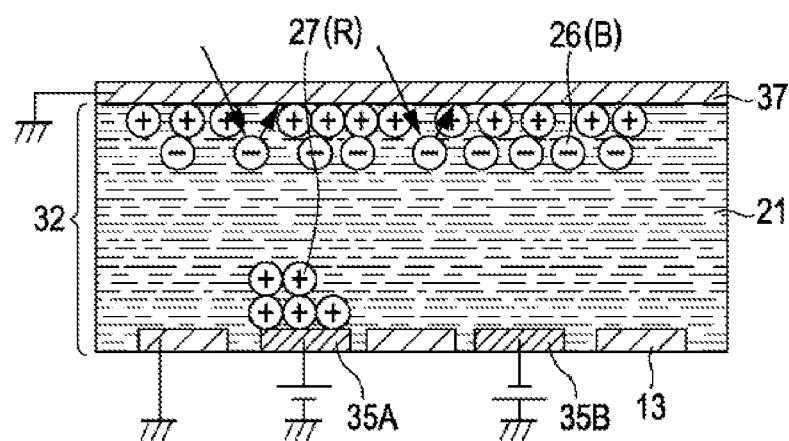

FIG. 17B is a diagram illustrating the distribution states of the electrically-charged particles during the black display in FIG. 17A.

Here, after the preset operation is performed by applying the negative voltage VL to the pixel electrode 35A and also applying the positive voltage VH to the pixel electrode 35B, first, the positive voltage Vh (Vh<VH) is applied to the pixel electrode 35A, so that some of the positively-charged particles 27(R) are distributed on the opposite electrode 37. Although the particles are some of the positively-charged particles 27(R), since the number of particles is large, the particles cover the opposite electrode 37. The amount of particles covering the opposite electrode 37 is an amount to allow red light to penetrate, as shown in FIG. 8B.

Thereafter, after a given time, the negative voltage VL is applied to the pixel electrode 35B, thereby making all the negatively-charged particles 26(B) be distributed below (just below) the positively-charged particles 27(R). Here, particle distribution in the vicinity of the opposite substrate 310 comes to the same state as that in FIG. 8D, so that the same black display can be realized.

Here, since black display also creates a black color in the vicinity of the opposite electrode 37, the visual angle is wide. Of course, since blue display is the same as that in FIG. 8C, the visual angle is wide for the same reason.

In this manner, an electrophoretic display device having a wide visual angle can be realized by using a large quantity of red particles.

As described so far, in the electrophoretic display device 100 related to this embodiment, by controlling the distribution states of the respective electrically-charged particles 26(B) and 27(R), basically, five color display, red, blue, magenta, white, and black, becomes possible, so that it is possible to realize various expressions. Further, since by controlling the application condition (an application time, application timing, the magnitude of applied voltage, or the like) of voltage, in addition to the expressions of the five colors described above, gradation expressions of the five colors can be realized and adjustment of brightness or saturation can also be performed, so that it is possible to realize full color or an expression close to it.

Further, when respectively moving the electrically-charged particles 26(B) and 27(R) from the pixel electrodes 35A and 35B to the opposite electrode 37 side, by inputting an electric potential which repels the electrically-charged particles that are movement targets to the reflective electrode 13, movement of the electrically-charged particles onto the reflective electrode 13 can be prevented, and as a result, it is possible to smoothly move the electrically-charged particles to the opposite electrode 37 side. Accordingly, switching displays can be stably performed in a short time.

Further, when obtaining black display, by moving the positively-charged red particles 27(R) having permeability in advance, thereby disposing them further on the opposite electrode 37 side than the negatively-charged blue particles 26(B) having reflectivity, it is possible to make external light incident from the opposite substrate 310 side be absorbed by each particle, so that an excellent and clear black display is realized.

Further, by alternately carrying out the first preset operation and the second preset operation for every rewriting of a single screen or plural screens, direct-current voltage is prevented from being applied between each of the pixel electrodes 35A and 35B and the opposite electrode 37, whereby it is possible to suppress corrosion of the electrodes or deterioration of the electrophoretic material, so that the electrophoretic display device 100 having high reliability is obtained.

Further, the explanation of the display method described above is an exemplification of a voltage application method when moving the electrically-charged particles and other methods are also possible.

For example, in a case where voltage which is applied to the reflective electrode 13 is set to be the same voltage as that of the opposite electrode 37, the following setting is performed.

In this case, when moving the electrically-charged particles from the opposite electrode 37 to the pixel electrodes 35A and 35B side, there is no problem. However, during the operation of moving the electrically-charged particles from the pixel electrodes 35A and 35B to the opposite electrode 37 side, the electrically-charged particles sometimes move onto the reflective electrode 13. In order to avoid this, the distance between each of the pixel electrodes 35A and 35B and the reflective electrode 13 in a plane direction is set so as to become longer than the distance (the cell gap d) between the opposite electrode 37 and each of the pixel electrodes 35A and 35B. Or, by forming an insulating film on the reflective electrode 13, setting is made such that the electric potential of the reflective electrode 13 does not affect the electrically-charged particles.

As another example, there is also a method of applying alternating-current voltage to the reflective electrode 13. There, when moving the electrically-charged particles to the opposite electrode 37 side, the movement is performed using two fields. For example, in the first field after preset, when moving the positively-charged particles 27(R) drawn and stuck onto the pixel electrode 35A to the opposite electrode 37 side, a positive voltage is applied to the pixel electrode 35A and a positive voltage is also applied to the reflective electrode 13. Thus, movement of the positively-charged particles 27(R) onto the reflective electrode 13 can be prevented and the positively-charged particles 27(R) smoothly move from above the pixel electrode 35A to the opposite electrode 37 side. That is, the positively-charged particles 27(R) which have been moved onto the reflective electrode 13 are repelled by the voltage of the reflective electrode 13 and move to the opposite electrode 37.

Further, in the next filed, when moving the negatively-charged particles 26(B) drawn and stuck onto the pixel electrode 35B to the opposite electrode 37 side, a negative voltage is applied to the pixel electrode 35B and a negative voltage is also applied to the reflective electrode 13. Accordingly, the negatively-charged particles 26(B) which have been moved onto the reflective electrode 13 are repelled, thereby smoothly moving to the opposite electrode 37 side.

Further, in the case of moving the negatively-charged particles 26(B) and the positively-charged particles 27(R) from the opposite electrode 37 to the pixel electrodes 35A and 35B side, the same voltage as that of the opposite electrode 37 is applied to the reflective electrode 13.

By voltage which is applied to the reflective electrode 13 in this manner, it is possible to perform assistance of movement control of any one of the respective electrically-charged particles 26(B) and 27(R).

Further, in the case of performing rewriting to the next display image (a case where displays are the same is also included), an image is reset once. At this time, the polarity of the voltage applied to the respective pixel electrodes 35A and 35B during the first preset operation carried out before the previous image is displayed and the polarity of the voltage applied to the respective pixel electrodes 35A and 35B during the second preset operation which is carried out before the next image is displayed are switched.

Accordingly, complete alternating-current driving can be performed by three electrodes including the pixel electrodes 35A and 35B and the opposite electrode 37. Therefore, corrosion of each electrode or deterioration of the electrophoretic material can be prevented.

Electrophoretic Display Device of Second Embodiment

Figure 18:
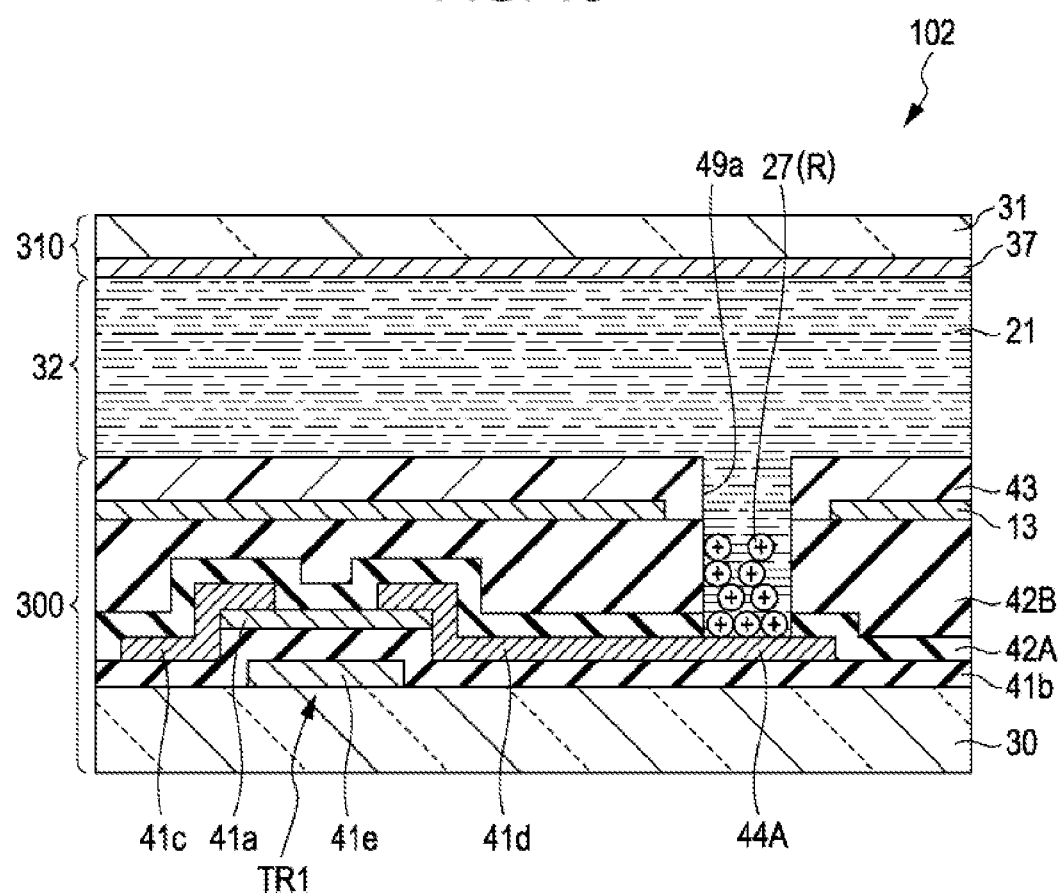
FIG. 18 is a fragmentary cross-sectional view showing the configuration of an electrophoretic display device related to a second embodiment.

FIG. 18 is a fragmentary cross-sectional view showing the configuration of an electrophoretic display device related to the second embodiment.

As shown in FIG. 18, an electrophoretic display device 102 related to the second embodiment is different from that of the first embodiment in that a plurality of island-shaped pixel electrodes is not provided on the surface (the surface on the electrophoretic layer 32 side) of the element substrate 300 and a portion of each of the connection electrodes 44A and 44B respectively connected to the drain electrodes 41d of the respective selection transistors TR1 and TR2 is configured to function as a pixel electrode.

In this embodiment, a plurality of through-holes having circular shapes in a plan view for partially exposing the respective connection electrodes 44A and 44B is formed in the interlayer insulating films 42A and 42B covering the connection electrodes 44A and 44B, and the protective film 43. Then, among these connection electrodes 44A and 44B, a portion of the connection electrode 44A which is exposed through a first through-hole 49a functions as the above pixel electrode 35A and a portion of the connection electrode 44B which is exposed through a second through-hole (not shown) functions as the above pixel electrode 35B. For this reason, for example, in a case where the negative voltage VL is applied to the connection electrode 44A, the positively-charged red particles 27(R) enter into the through-hole 49a and are congregated on (drawn and stuck onto) the connection electrode 44A which is exposed in the through-hole 49a.

The connection electrodes 44A and 44B are made of Al and have reflectivity. For this reason, the connection electrodes 44A and 44B also have the action of controlling the movement of the electrically-charged particles 26(B) and 27(R) by voltages which are applied to the respective connection electrodes 44A and 44B and also reflecting external light to the opposite substrate 310 side.

The protective film 43 is formed on the reflective electrode 13. For this reason, a low voltage is applied from the reflective electrode 13 to the electrically-charged particles through the protective film 43. Accordingly, attachment of the electrically-charged particles 26(B) and 27(R) onto the reflective electrode 13, that is, onto the protective film 43 is prevented. For this reason, the thickness of the protective film 43 is set to be a value capable of preventing attachment of the electrically-charged particles 26(B) and 27(R) without affecting movement control of the electrically-charged particles 26(B) and 27(R). Here, the thickness of the protective film 43 is 2 μm or greater, more preferably, 10 μm or greater. Alternately, it is 5% or greater, more preferably, 50% or greater of the cell gap d.

Further, according to the configuration described above, since there is no need separately to form pixel electrodes, the configuration can be simplified and manufacturing is also facilitated.

Further, the reflective electrode 13 is formed in a solid state on the entire image display section 5 and configured to be common in the respective pixels. However, it may also be provided independently for each pixel. In this case, the reflective electrodes 13 are electrically connected to the lower connection electrodes 44A and 44B through through-holes. Here, the reflective electrodes 13 are divided into two groups each including a plurality of reflective electrodes 13 in a pixel, and by connecting the plurality of reflective electrodes 13 in the first group to each other through the connection electrode 44A and connecting the plurality of reflective electrodes 13 in the second group to each other in the connection electrode 44B, it becomes possible to drive the plurality of reflective electrodes 13 of the respective groups independently of each other.

Further, at this time, voltages that the reflective electrodes 13 apply to the electrically-charged particles 26(B) and 27(R) are always smaller than voltages which are applied to the connection electrodes 44A and 44B, and have the same polarity. For this reason, the electric potentials of the reflective electrodes 13 do not obstruct movement of the electrically-charged particles 26(B) and 27(R).

Electrophoretic Display Device of Third Embodiment

Figure 19:
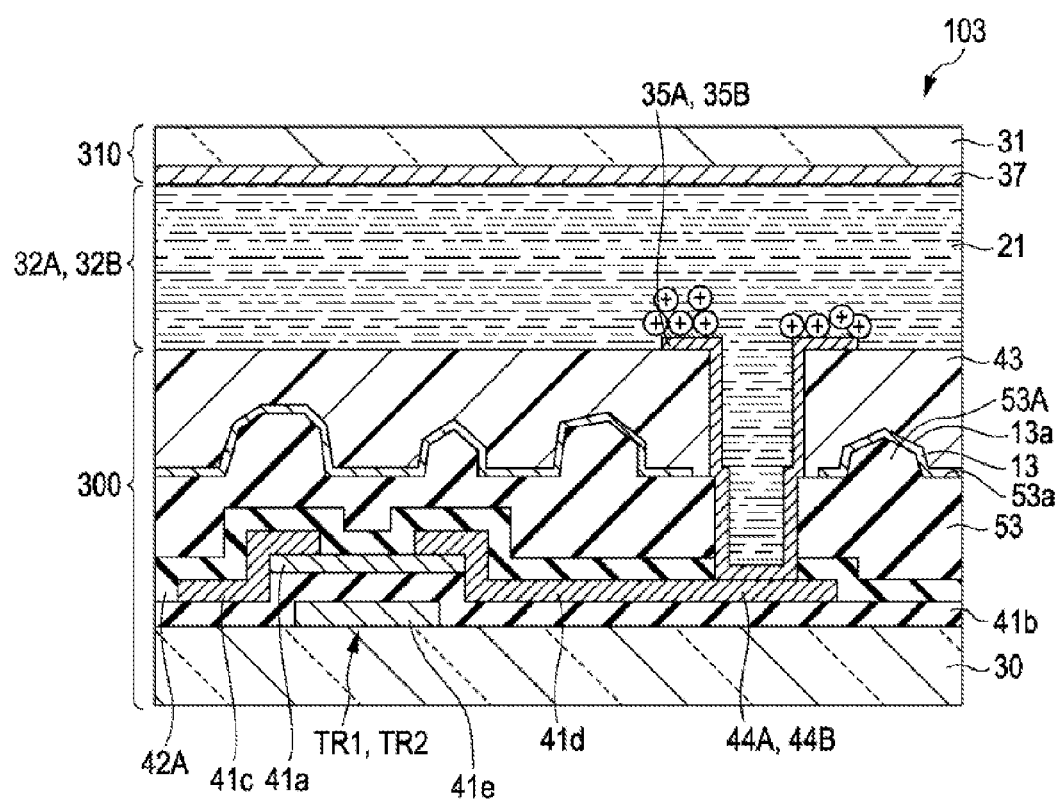
FIG. 19 is a fragmentary cross-sectional view showing the configuration of an electrophoretic display device related to a third embodiment.

FIG. 19 is a fragmentary cross-sectional view showing the configuration of an electrophoretic display device related to the third embodiment.

As shown in FIG. 19, the electrophoretic display device related to the third embodiment will be described.

In an electrophoretic display device 103 related to this embodiment, on the first substrate 30 side, the interlayer insulating film 42A is formed so as to cover the selection transistors TR1 and TR2 formed on the gate insulating film 41b and the connection electrodes 44A and 44B which are connected to the pixel electrodes 35A and 35B, and an interlayer insulating film 53 made of photosensitive acrylic and having a thickness of 2 μm is formed on the interlayer insulating film 42A. A surface 53a of the interlayer insulating film 53 in this embodiment is formed into a concave-convex shape and has a plurality of convex portions 53A which protrudes to the electrophoretic layer 32 side which is the opposite side to the interlayer insulating film 42A. The plurality of convex portions 53A is present in at least one pixel, and the shape in a plan view, the cross-sectional shape, the height, or the like of each convex portion 53A is made to be non-uniform and the positions of the convex portions 53A are also arranged in a random manner.

On such an interlayer insulating film 53, the reflective electrode 13 having a given thickness is provided to follow the shape of the surface 53a. The reflective electrode 13 is formed using Al or the like, the thickness thereof is thinner compared to the thickness of the interlayer insulating film 53, and the reflective electrode 13 has a shape reflecting the surface 53a of the interlayer insulating film 53, that is, the outer shapes of the convex portions 53A. Accordingly, a surface 13a of the reflective electrode 13 becomes a scattering surface, thereby being capable of reducing regular reflection of external light during white display.

In addition, the protective film 43 formed on the reflective electrode 13 serves as a planarizing film.

MODIFIED EXAMPLE 1

Figure 20A:
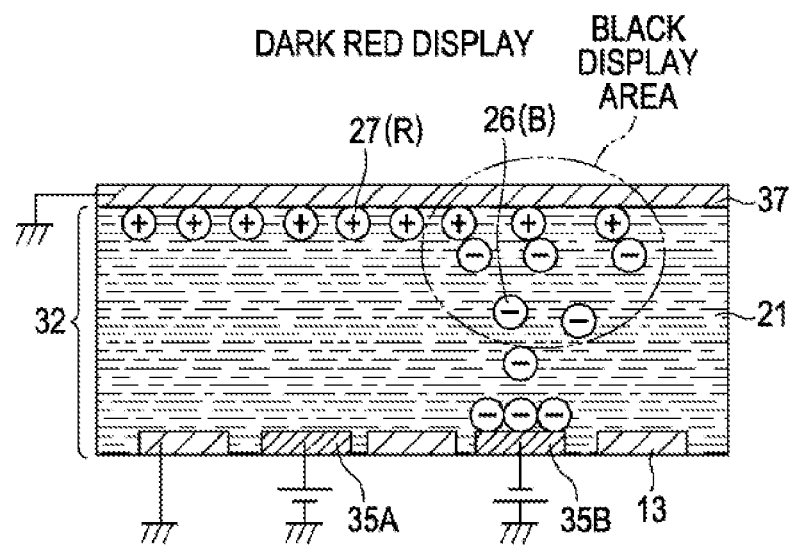
FIG. 20A is a diagram illustrating the distribution states of the particles during dark red display.
Figure 20B:
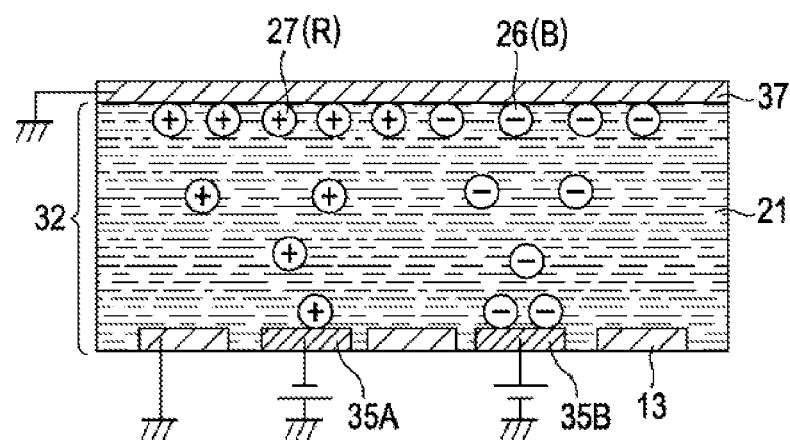
FIG. 20B is a diagram illustrating the distribution states of the particles during magenta display.

FIG. 20A is a diagram illustrating the distribution states of the particles during dark red display, and FIG. 20B is a diagram illustrating the distribution states of the particles during magenta display.

As shown in FIGS. 8A to 8D, 9A, 9B, and 10, hitherto, a description in which almost all the particles which move from the pixel electrodes 35A and 35B to the opposite electrode 37 are located in the vicinity of the opposite electrode 37 has been performed. However, in fact, some of the particles are sometimes located in the dispersion medium 21. Examples showing this are FIGS. 20A and 20B.

FIG. 20A is a modified example of FIG. 9A. Some of the negatively-charged blue particles 26(B) are located in the dispersion medium 21. As a result, dark red display can be obtained.

FIG. 20B is a modified example of FIG. 11A. Some of the electrically-charged red and blue particles 27(R) and 26(B) are located in the dispersion medium 21. As a result, magenta display can be obtained.

Also in this state, gradation or a mixed color can be displayed by the effective distribution area of the particles viewed from the visible side of the opposite electrode 37.

Further, although it is not shown in the drawing, also in the white state in FIG. 8A, a state where some of the particles are located in the dispersion medium 21 is also acceptable. In this manner, in all the drawings explained hitherto, some of the particles may also be located in the dispersion medium.

MODIFIED EXAMPLE 2

Figure 21:
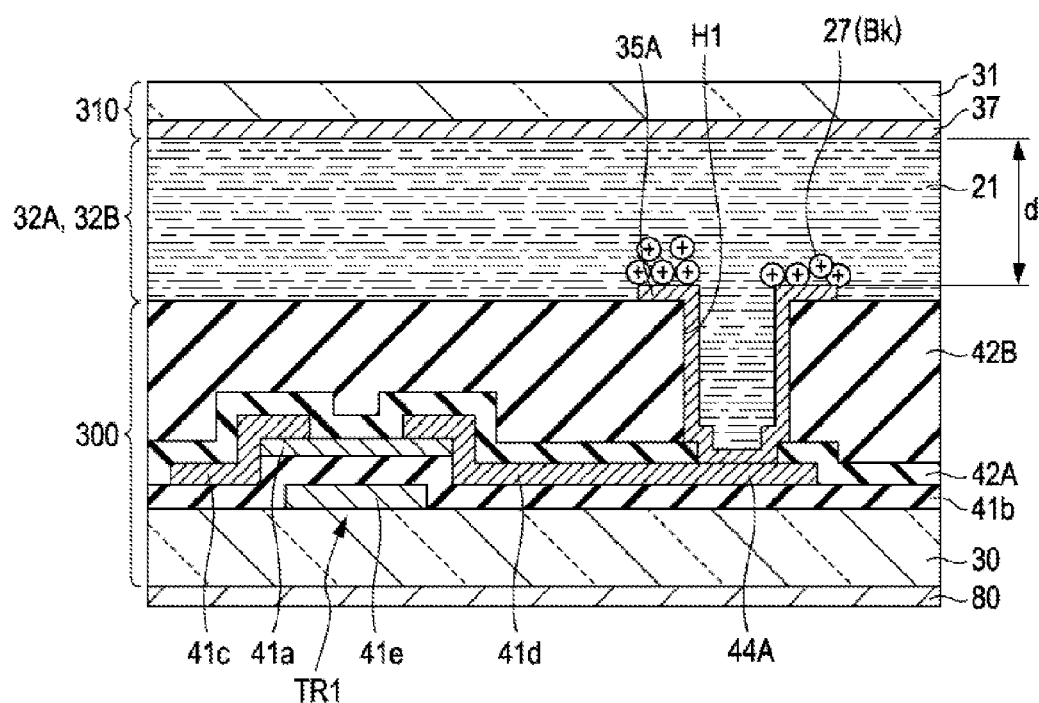
FIG. 21 is a fragmentary cross-sectional view showing Modified example 2 of the electrophoretic display device.

FIG. 21 is a fragmentary cross-sectional view showing Modified example 2 of the electrophoretic display device.

As shown in FIG. 21, here, a reflective film (a reflective electrode) 80 made of Al is provided on the rear surface of the first substrate. The reflective film 80 is bonded to the rear surface of the first substrate 30 through a transparent adhesive. In addition, in place of the reflective film 80, metal such as Al may also be directly formed on the rear surface of the first substrate 30. Further, in this example, since a reflective film is not provided on the selection transistors TR1 and TR2 side, the protective film 43 is not used.

In this manner, in the case of a configuration in which the reflective film 80 is provided on the rear surface side of the element substrate 300, since the reflective film 80 can be formed in a solid state, reflectivity can be increased and manufacturing is also facilitated.

The preferred embodiments related to the invention have been described above with reference to the accompanying drawings. However, it goes without saying that the invention is not limited to such examples. It will be apparent to those skilled in the art that various change examples or modification examples can be contemplated within the scope of the technical idea stated in the appended claims, and it is to be understood that these examples naturally also belong to the technical scope of the invention.

In the embodiments described above, a configuration has been described in which as the electrically-charged particles constituting the electrophoretic layer 32, the negatively-charged blue particles 26(B) and the positively-charged red particles 27(R) are provided. However, the combination of the colors and the charging polarities of the electrically-charged particles are not limited thereto and the colors and the polarities of the electrically-charged particles can be variously combined. Further, the combination of the colors and the polarities of the reflective particles and the transparent particles are also not limited to those described above.

As the combination of the colors of the electrically-charged particles, colors having a complementary color relationship are preferable and, for example, the combination of a green and magenta, a blue and a yellow, or the like is also acceptable.

Figure 22:
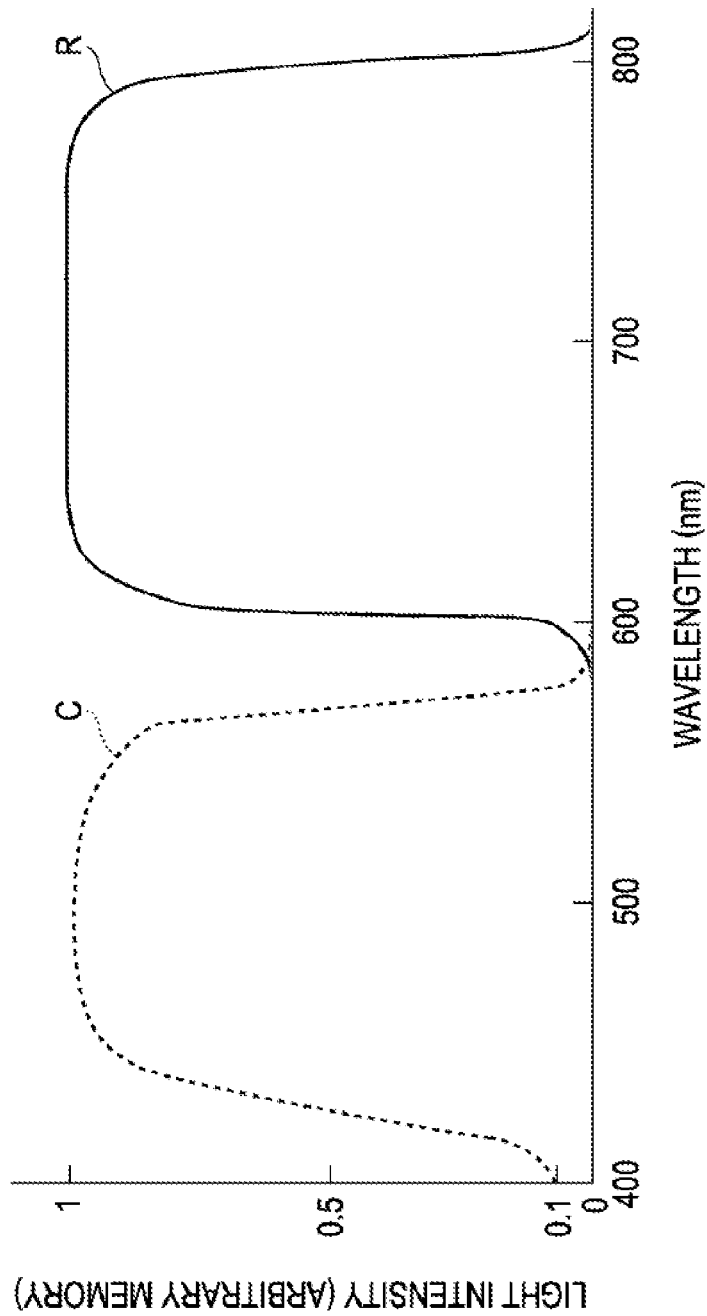
FIG. 22 is a diagram illustrating the reflection spectra of a reflective particle of a red color and a transparent particle of a cyan color.
Figure 23:
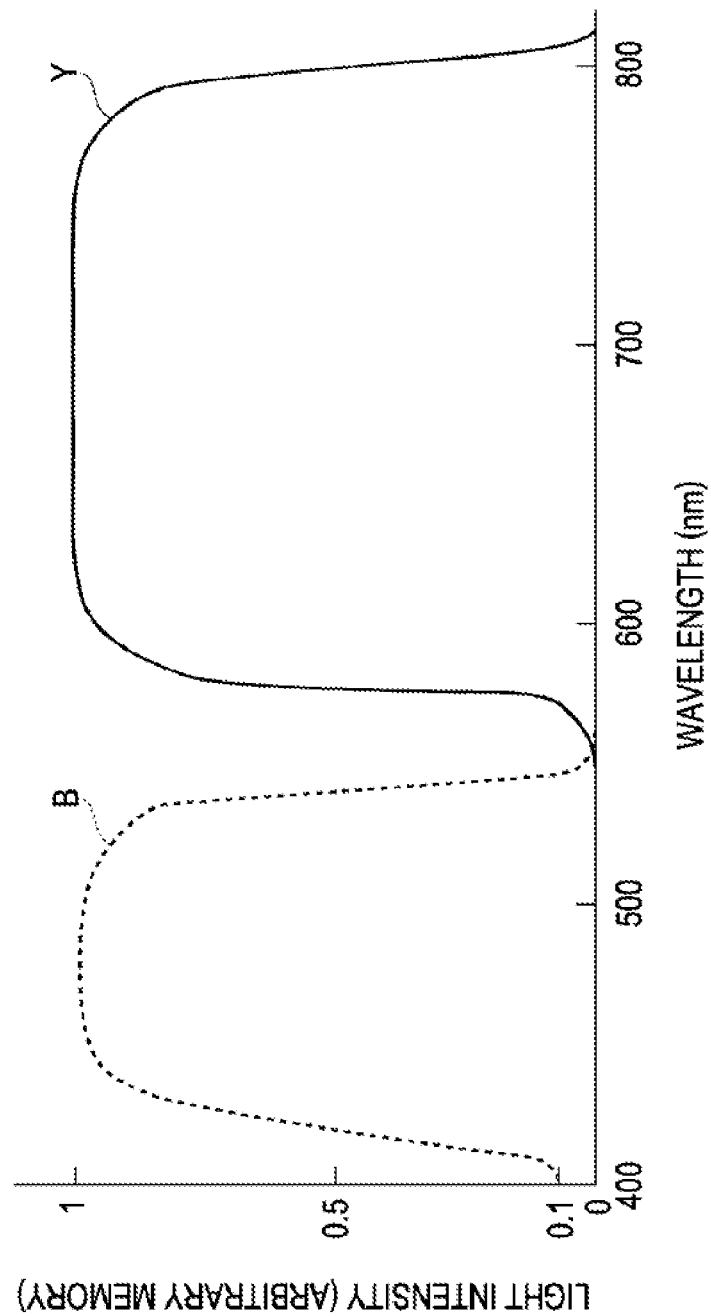
FIG. 23 is a diagram illustrating the reflection spectra of a transmissive particle of a blue color and a reflective particle of yellow color.

Here, in the case of an electrophoretic layer in which red-colored reflective particles and cyan-colored transparent particles are retained in the dispersion medium 21, the limitation of common wavelength of a spectrum in transmission and reflection (scattering) of each color in an electrically-charged particle is as described above. In the reflection spectra of a reflective particle of a red (R) and a transparent particle of a cyan (C) shown in FIG. 22 and the reflection spectra of a transmissive particle of a blue (B) and a reflective particle of a yellow (Y) shown in FIG. 23, overlap of the reflection spectra of color particles in each combination is 2% or less.

According to this, it is possible to express five colors, that is, white display, black display, display of the color of the electrically-charged particle on one side, display of the color of the electrically-charged particle on the other side, and mixed-color display of the colors of the two types of electrically-charged particles, including gradation display of each color. Therefore, an electrophoretic display device in which bright and high-contrast full-color display is possible can be obtained.

Further, even if colors are not those having a complementary color relationship, provided that transmission or reflection intensities do not overlap, any combination is also acceptable. For example, bright display can be realized using greenish red and greenish blue in place of a red and a blue.

Display is performed by making the electrically-charged particles be located in the vicinity of the opposite electrode 37 and a memory property of a particle position is provided at the opposite electrode 37 or the pixel electrodes 35A and 35B, whereby a memory property of display can be provided.

As display during preset, the white display shown in FIG. 8A has been used. However, it is also possible to use the black display shown in FIG. 8D.

Further, the planar shape of each of the pixel electrodes 35A and 35B is not limited to that described above and a stripe, an ellipse, a polygon, or the like may also be used. It is acceptable if it is a shape of allowing the distribution ranges of the respective particles to be at least partially overlapped when distributing two types of electrically-charged particles on the opposite electrode 37.

The equivalent circuits shown in FIGS. 1B and 2 are based on a one-transistor and one-capacitor structure (a 1T1C structure). It is also possible to use other equivalent circuits. For example, a two-transistor and one-capacitor circuit or the like is also acceptable.

Electronic Apparatus

Next, a description will be performed with regard to a case where the electrophoretic display device related to each embodiment described above is applied to an electronic apparatus.

Figure 24A:
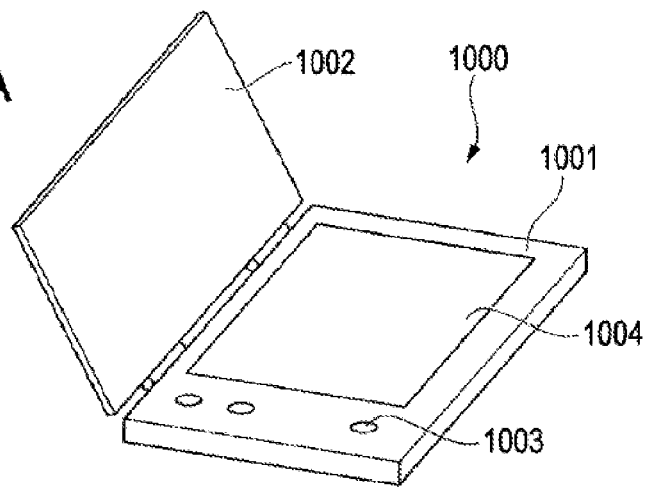
FIGS. 24A to 24C are perspective views describing specific examples of an electronic apparatus to which the electrophoretic display device according to the invention is applied.
Figure 24B:
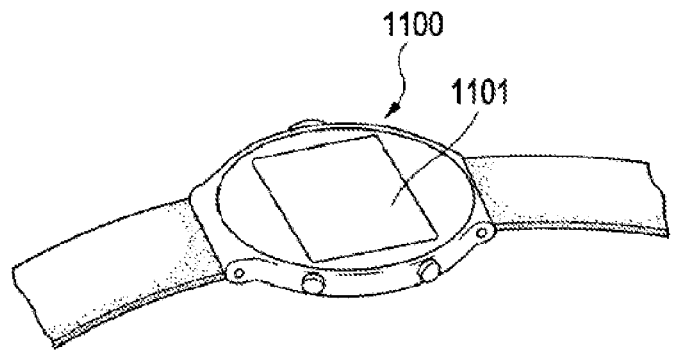
Figure 24C:
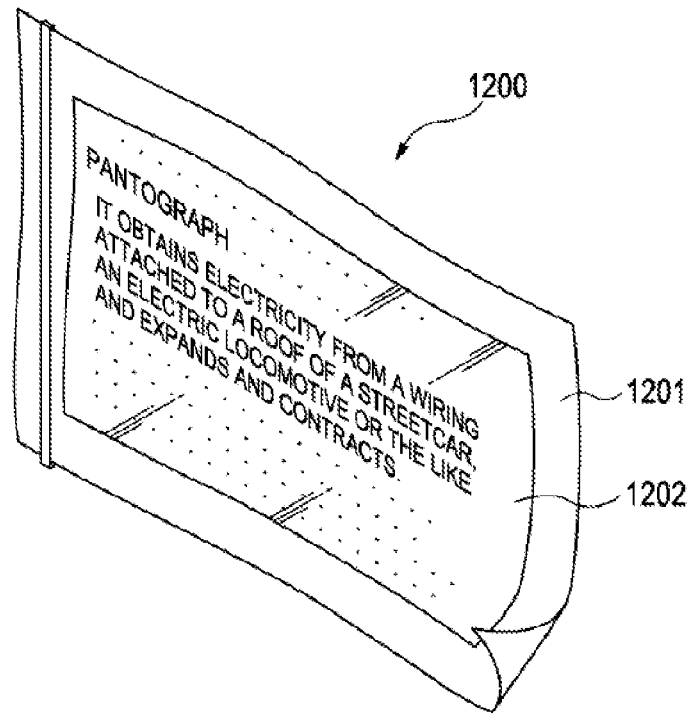

FIGS. 24A to 24C are perspective views describing specific examples of an electronic apparatus to which the electrophoretic display device according to the invention is applied.

FIG. 24A is a perspective view showing an electronic book that is one example of an electronic apparatus. This electronic book (the electronic apparatus) 1000 is provided with a book-shaped frame 1001, a (openable and closable) cover 1002 provided so as to be capable of turning with respect to the frame 1001, an operating section 1003, and a display section 1004 constituted by the electrophoretic display device according to the invention.

FIG. 24B is a perspective view showing a wristwatch that is one example of an electronic apparatus. This wristwatch (the electronic apparatus) 1100 is provided with a display section 1101 constituted by the electrophoretic display device according to the invention.

FIG. 24C is a perspective view showing an electronic paper that is one example of an electronic apparatus. This electronic paper (the electronic apparatus) 1200 is provided with a main body section 1201 which is constituted by a rewritable sheet having similar texture and flexibility to paper, and a display section 1202 constituted by the electrophoretic display device according to the invention.

For example, since the electronic book, the electronic paper, or the like assumes the use of repeatedly writing characters on a white background, elimination of a residual image during erasure or a temporal residual image is required.

In addition, the range of an electronic apparatus to which the electrophoretic display device according to the invention can be applied is not limited thereto and broadly includes apparatuses using a change in visual color tone associated with movement of electrically-charged particles.

According to the electronic book 1000, the wristwatch 1100, and the electronic paper 1200 described above, since the electrophoretic display device according to the invention is adopted, a high-grade electronic apparatus having excellent reliability, which can perform display close to full color being bright and having excellent visibility, is provided.

In addition, the electronic apparatus described above is for exemplifying the electronic apparatus related to the invention and does not limit the technical scope of the invention. The electrophoretic display device related to the invention can also be suitably used in, for example, a display section of an electronic apparatus such as a mobile telephone or a portable audio apparatus, or an electronic paper such as a sheet for business use such as a manual, a textbook, a workbook, or an information sheet.

The entire disclosure of Japanese Patent Application No. 2011-045557, filed Mar. 2, 2011 is expressly incorporated by reference herein.

What is claimed is:

1. An electrophoretic display device comprising:
   first and second substrates disposed to face each other;
   an electrophoretic layer which is disposed between the first substrate and the second substrate and has a plurality of first electrically-charged particles colored into a first color, a plurality of second electrically-charged particles colored into a second color, and a dispersion medium which retains the first and second electrically-charged particles;
   first and second pixel electrodes which are disposed on the electrophoretic layer side of the first substrate and driven independently of each other;
   an opposite electrode which is disposed on the electrophoretic layer side of the second substrate; and
   a reflective electrode which is provided at a position on the first substrate side rather than on the electrophoretic layer,
   wherein the first electrically-charged particle has transmittance in a first wavelength region and absorbability in other wavelength regions,
   the second electrically-charged particle has reflectivity in a second wavelength region and absorbability in other wavelength regions, and
   intensity of a light overlapping the first wavelength region and the second wavelength region is equal to or less than 10% of the maximum value of each light intensity in the first wavelength region and the second wavelength region.

2. The electrophoretic display device according to claim 1, wherein a first transistor which is connected to the first pixel electrode and a second transistor which is connected to the second pixel electrode are provided for each pixel, and
   the first electrically-charged particles and the second electrically-charged particles are electrically charged to have any one of a positive polarity and a negative polarity.

3. The electrophoretic display device according to claim 1, further comprising:
   a first connection electrode formed in a layer on the first substrate side rather than on the first pixel electrode and connected to a drain electrode of the first transistor; and
   a second connection electrode connected to a drain electrode of the second transistor,
   wherein a plurality of the first pixel electrodes are connected to each other by the first connection electrode, and
   a plurality of the second pixel electrodes are connected to each other by the second connection electrode.

4. The electrophoretic display device according to claim 3, wherein a plurality of through-holes which partially expose the first and second connection electrodes are formed in a covering layer provided on the first substrate so as to cover the first connection electrode and the second connection electrode,
  a portion of the first connection electrode which is exposed through the first through-hole is configured to function as the first pixel electrode, and
  a portion of the second connection electrode which is exposed through the second through-hole is configured to function as the second pixel electrode.

5. The electrophoretic display device according to claim 1, wherein a metal oxide film is formed on the surface of the reflective electrode or the surface of the reflective electrode is formed by an oxide.

6. The electrophoretic display device according to claim 1, wherein the reflective electrode is configured such that an electric potential can be input thereto.

7. The electrophoretic display device according to claim 1, wherein during a black display, the first electrically-charged particles having transmittance are disposed on the opposite electrode side rather than on the second electrically-charged particles having reflectivity.

8. A method of driving an electrophoretic display device which includes first and second substrates disposed to face each other, an electrophoretic layer which is disposed between the first substrate and the second substrate and has a plurality of first electrically-charged particles colored into a first color, a plurality of second electrically-charged particles colored into a second color, and a dispersion medium which retains the first and second electrically-charged particles, a plurality of first pixel electrodes and a plurality of second pixel electrodes which are disposed on a surface on the electrophoretic layer side of the first substrate and driven independently of each other, an opposite electrode which is disposed on the electrophoretic layer side of the second substrate, and a reflective electrode which is provided at a position on the first substrate side rather than on the electrophoretic layer, wherein the first electrically-charged particle has transmittance in a first wavelength region and absorbability in other wavelength regions, and the second electrically-charged particle has reflectivity in a second wavelength region and absorbability in other wavelength regions, and intensity of a light overlapping the first wavelength region and the second wavelength region is equal to or less than 10% of the maximum value of each light intensity in the first wavelength region and the second wavelength region, the method comprising:
  performing a first operation of moving the first electrically-charged particles to the opposite electrode side by applying voltages to the first pixel electrode and the opposite electrode; and
  performing a second operation of moving the second electrically-charged particles to the opposite electrode side by applying voltages to the second pixel electrode and the opposite electrode.

9. The method of driving an electrophoretic display device according to claim 8, wherein between the first operation and the second operation, a difference is provided at application timings of the voltages or the magnitudes of the applied voltages.

10. The method of driving an electrophoretic display device according to claim 8, wherein in the first operation, an electric potential which repels the first electrically-charged particles is applied to the reflective electrode, and in the second operation, an electric potential which repels the second electrically-charged particles is applied to the reflective electrode.

11. The method of driving an electrophoretic display device according to claim 8, further comprising:
  a first preset operation of applying different voltages to the first pixel electrode and the second pixel electrode; and
  a second preset operation of applying voltages having the opposite polarities to those of the voltages in the first preset operation to the first pixel electrode and the second pixel electrode,
  wherein the first preset operation and the second preset operation are alternately carried out for every rewriting of a single screen or plural screens.

12. The method of driving an electrophoretic display device according to claim 8, wherein the first electrically-charged particles having transmittance are disposed on the opposite electrode side rather than on the second electrically-charged particles having reflectivity.

13. The method of driving an electrophoretic display device according to claim 12, wherein a substantial number of the first electrically-charged particles are stacked on the opposite electrode in a multilayer state so as to overlap each other.

14. An electronic apparatus comprising: the electrophoretic display device according to claim 1.

15. A method of driving an electrophoretic display device which includes: first and second substrates disposed to face each other, an electrophoretic layer which is disposed between the first substrate and the second substrate and has a plurality of first electrically-charged particles colored into a first color, a plurality of second electrically-charged particles colored into a second color, and a dispersion medium which retains the first and second electrically-charged particles, a plurality of first pixel electrodes and a plurality of second pixel electrodes which are disposed on a surface on the electrophoretic layer side of the first substrate and driven independently of each other, an opposite electrode which is disposed on the electrophoretic layer side of the second substrate, and a reflective electrode which is provided at a position on the first substrate side rather than on the electrophoretic layer, wherein the first electrically-charged particle has transmittance in a first wavelength region and absorbability in other wavelength regions, and the second electrically-charged particle has reflectivity in a second wavelength region and absorbability in other wavelength regions, the method comprising:
  performing a first operation of moving the first electrically-charged particles to the opposite electrode side by applying voltages to the first pixel electrode and the opposite electrode; and
  performing a second operation of moving the second electrically-charged particles to the opposite electrode side by applying voltages to the second pixel electrode and the opposite electrode;
  a first preset operation of applying different voltages to the first pixel electrode and the second pixel electrode; and
  a second preset operation of applying voltages having the opposite polarities to those of the voltages in the first preset operation to the first pixel electrode and the second pixel electrode,
  wherein the first preset operation and the second preset operation are alternately carried out for every rewriting of a single screen or plural screens.

* * * * *